INVENTORS
GRANT N. WILLIS
LIONEL H. SECCOMBE, JR.
BY IRVING Y LAKE

Lindsey and Prutzman
ATTORNEYS

INVENTORS
GRANT N. WILLIS
LIONEL H. SECCOMBE, JR.
BY IRVING Y. LAKE

Lindsey and Prutzman
ATTORNEYS

INVENTORS
GRANT N. WILLIS
LIONEL H. SECCOMBE, JR.
BY IRVING Y. LAKE
Lindsey and Prutzman
ATTORNEYS INVENTORS
GRANT N. WILLIS
LIONEL H. SECCOMBE, JR.
BY IRVING Y. LAKE
Lindsey and Prutzman
ATTORNEYS INVENTORS
GRANT N. WILLIS
LIONEL H. SECCOMBE, JR.
IRVING Y. LAKE
BY
Lindsey and Prutzman
ATTORNEYS INVENTORS
GRANT N. WILLIS
LIONEL H. SECCOMBE, JR.
BY IRVING Y. LAKE
Lindsey and Prutzman
ATTORNEYS INVENTORS
GRANT N. WILLIS
LIONEL H. SECCOMBE, JR.
BY IRVING Y. LAKE
Lindsey and Prutzman
ATTORNEYS

INVENTORS
GRANT N. WILLIS
LIONEL H. SECCOMBE, JR.
BY IRVING Y. LAKE

Lindsey and Prutzman
ATTORNEYS

Nov. 29, 1960 G. N. WILLIS ET AL 2,961,753

MACHINE FOR AUTOMATICALLY ASSEMBLING CONTACTS IN SUBMINIATURE SOCKETS

Filed Jan. 2, 1958 13 Sheets-Sheet 9

INVENTORS
GRANT N. WILLIS
LIONEL H. SECCOMBE, JR.
BY IRVING Y. LAKE

Lindsey and Prutzman
ATTORNEYS

INVENTORS
GRANT N. WILLIS
LIONEL H. SECCOMBE, JR.
BY IRVING Y. LAKE
Lindsey and Prutzman
ATTORNEYS Nov. 29, 1960 G. N. WILLIS ET AL 2,961,753
MACHINE FOR AUTOMATICALLY ASSEMBLING CONTACTS
IN SUBMINIATURE SOCKETS
Filed Jan. 2, 1958 13 Sheets-Sheet 11

INVENTORS
GRANT N WILLIS
LIONEL H. SECCOMBE, JR.
BY IRVING Y. LAKE

Lindsey and Prutzman
ATTORNEYS

INVENTORS
GRANT N. WILLIS
LIONEL H. SECCOMBE, JR.
BY IRVING Y. LAKE

Lindsey and Prutzman
ATTORNEYS

INVENTORS
GRANT N. WILLIS
LIONEL H. SECCOMBE, JR.
IRVING Y. LAKE

BY Lindsey and Prutzman
ATTORNEYS

United States Patent Office 2,961,753
Patented Nov. 29, 1960

2,961,753

MACHINE FOR AUTOMATICALLY ASSEMBLING CONTACTS IN SUBMINIATURE SOCKETS

Grant N. Willis and Lionel H. Seccombe, Jr., Bristol, and Irving Y. Lake, Terryville, Conn., assignors, by mesne assignments, to United-Carr Fastener Corporation, Boston, Mass., a corporation of Delaware Filed Jan. 2, 1958, Ser. No. 707,077

16 Claims. (Cl. 29—206)

This invention relates to a novel and improved machine for automatically assembling contacts in subminiature sockets.

It is an object of this invention to provide a novel and improved machine for automatically inserting and seating contacts in properly oriented position in subminiature sockets for transistors or tubes and for subsequently automatically deforming the contacts to retain them in the socket.

It is another object of this invention to provide a machine of the type described having automatic flash breaking means for clearing the contact seats in cast plastic sockets prior to loading of the contacts therein and which is also adapted to determine whether the castings are properly oriented in the machine and, if not, to prevent continued machine operation until the improperly oriented casting is removed.

It is a further object of this invention to provide a machine of the type described which is adapted for use with a variety of contact deforming mechanisms to provide contact configurations particularly suited to various applications and it is included in this object to provide a plurality of deforming mechanisms for use with the machine which may be incorporated therewith, as desired.

It is a further object of this invention to provide a machine of the type described in which the operation of each of the various elements of the machine is controlled in timed relation to the others by simple yet reliable mechanisms to provide freedom from down time on the machine attendant to set-up and maintenance of complex controls often associated with automatic machinery.

It is still another object of this invention to provide a machine of the type described which is rugged so as to withstand long periods of continuous running without breakdown or without requiring shutdown for preventive maintenance thus being particularly adapted to economical mass production usage.

Other objects will be in part obvious, and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 1:
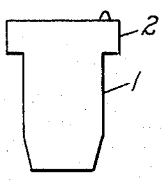
Fig. 1 is an end view of a socket of a type which this invention is concerned.
Figure 3:
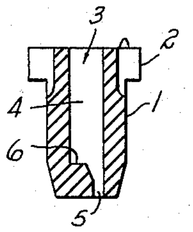
Fig. 3 is a cross-sectional view substantially along the line 3—3 of Fig. 2.
Figure 2:
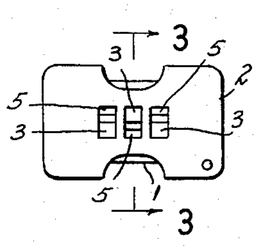
Fig. 2 is a top view of the socket of Fig. 1.

It is believed that the following detailed description of the invention will be more readily understood if a description of the socket and contacts with which the invention is concerned, as well as a general description of the machine and purpose thereof, is now provided. With reference to Figs. 1–3, a sub-miniature socket of a type with which the invention is concerned comprises a body 1 cast from an electrically nonconducting plastic material and having flanges or lips 2 around the top periphery thereof. The body is provided with a plurality of aligned contact receiving apertures 3 having a relatively wide portion 4 at the top thereof terminating in a relatively narrow slot 5 opening outwardly of the bottom of the socket. The slots 5 are alternately disposed on opposite sides of the longitudinal centerline of the top of the socket and at their juncture with the wider portions of the apertures form shoulders or seats 6. The specific socket shown has three such apertures; however, it is to be understood that the number of apertures is by way of example only and may vary with the specific use of the socket.

Figure 4:
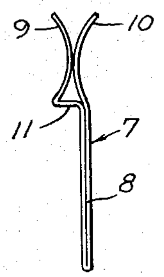
Fig. 4 is an elevational view of a contact of a type with which this invention is concerned.

With reference to Fig. 4 a contact 7 of a type intended for assembly in the apertures of the socket comprises a thin flat strip of wire of electrically conductive metal which is reversely bent to provide a double-thickness tail 8 at the lower end of the contact. The upper ends of the contact are bowed inwardly toward each other to provide a pair of gripping arms 9, 10 which, when the contact is assembled in the socket, are adapted to resiliently engage the prongs of a transistor or tube and provide an electrical connection therewith. The arms 9 and 10 are offset relative to the tail 8 to provide a shoulder 11 extending laterally of the contact which, when the contact is inserted in one of the recesses of the socket with the tail thereof received in the narrow slot, is engageable with the seat or shoulder 6 of the recess to accurately position the contact longitudinally of the recess.

Figure 6:
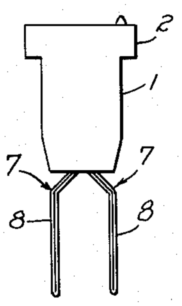
Fig. 6 is an end view of a socket and contact assembly similar to Fig. 5 but with the contacts deformed in another configuration.
Figure 5:
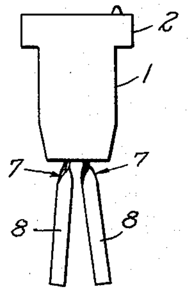
Fig. 5 is an end view of the socket of Fig. 1 with a plurality of contacts such as shown in Fig. 4 assembled therein and with the contacts deformed to retain them in the socket.
Figure 7:
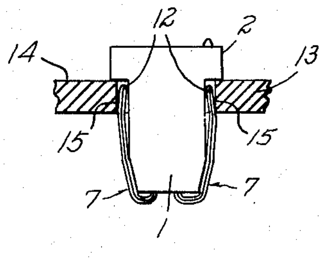
Fig. 7 is an end view of a socket and contact assembly similar to Fig. 5 with the contacts deformed in still another configuration and with the assembly seated in a panel, a portion of which is shown in section.

This invention contemplates a variety of ways of deforming the tails 8 of the contacts, once the contacts have been seated in the socket, in order to retain them therein. Three such ways are shown in Figs. 5–7. In Fig. 5 the tails of the contacts are twisted about their longitudinal axes and are also spread slightly in alternately opposite directions to facilitate later soldering or other suitable connection of the contacts to electrical leads. In Fig. 6 the tails are offset laterally of the longitudinal centerline of the bottom of the socket with next adjacent contacts being offset in opposite directions to facilitate later connections. In Fig. 7 the tails of the contacts are reversely bent back and upwardly along the sides of the socket with the tails of next adjacent contacts being bent upwardly along opposite sides of the socket. The bending of the tails in this manner not only serves to retain the contacts on the socket but also provide a means to resiliently retain the socket in an aperture in a panel such as a printed circuit board. A portion 13 of such a panel is shown in Fig. 7, and as can be seen, with the socket inserted in an aperture in the panel with the lip of the socket abutting the face 14 of the panel, the free ends 12 of the tails resiliently engage the edges 15 of the aperture in the panel to retain the socket seated in the panel.

Figure 8:
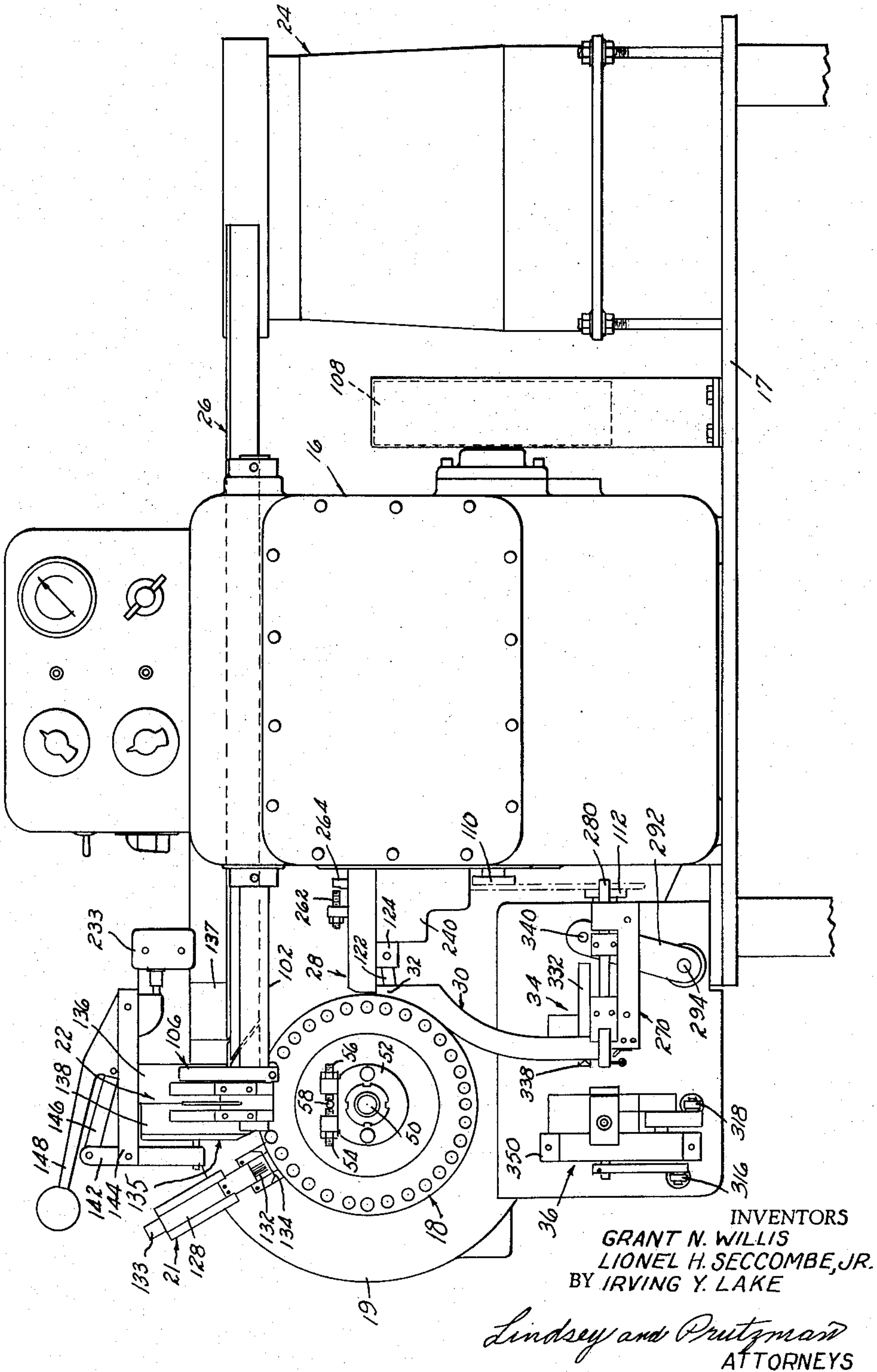
Fig. 8 is a side elevational view of a socket and contact assembling machine embodying the present invention.

Turning now to the machine of this invention and with particular reference to Fig. 8, the machine comprises a main housing 16 adapted to be supported on a table or the like 17 and containing the main drive gearing and control cams for the machine. A rotatable wheel or work carrier 18 is mounted on a forward extention 19 of the main housing and is provided with a plurality of pockets or recesses 20 along its periphery, more clearly shown in Fig. 10. It is intended that castings will be manually loaded into the wheel with the sockets supported on the edge of the wheel pockets by the lips at the top thereof and with the bodies of the sockets extending radially inwardly of the wheel. The sockets should be oriented so that the row of contact receivable apertures therein extends circumferentially of the wheel. As will be later seen the wheel is discretely advanced in increments corresponding to the spacing of the contact receivable apertures in the socket. Supported on the forward project of the main housing 16 along the path of movement of the wheel is the flash breaker 21 which is the portion of the machine initially operable on the sockets. The flash breaker has pins or prongs insertable into the contact receivable apertures of the sockets to clear any flash therein. The flash breaker also serves to determine whether each casting is properly oriented so as to be in proper position for subsequent insertion of the contacts, and if an improperly oriented casting is detected, the flash breaker will automatically stop the machine until the casting is cleared from the wheel and the flush breaker reset. The operation of the flash breaker is in timed relation to the advance of the wheel 18 and operates once on each socket.

Figure 13:
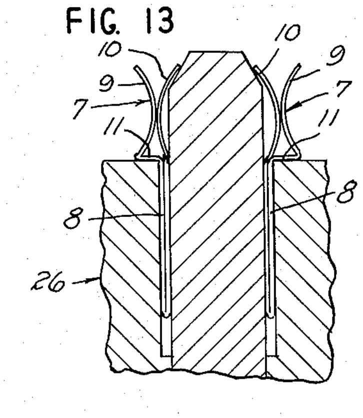
Fig. 13 is an enlarged fragmentary cross-sectional view of the contact feed rail of the machine of Fig. 8 showing the orientation of the contacts in the rail.

Located next adjacent to the flash breaker is the contact inserting portion 22 of the machine. The contacts are fed to the inserter from a hopper 24 at the rear of the machine along a rail 26 at the top of the machine in two parallel rows as shown in Fig. 13 with the contacts in each row oriented in a like manner but with the shoulders of the contacts in one row facing in an opposite direction from the shoulders in the other row. This reverse orientation of the contacts is necessary because of the staggered arrangement of the tail receiving slots in the sockets. The inserter portion feeds contacts into the sockets one at a time first from one row of contacts and then one from the other row in timed relation to indexing of the socket carrying wheel. The inserter does not seat the contacts in the sockets but only inserts them with the top of the contact flush with the top of the socket.

The contacts are automatically seated in the castings by a seater mechanism 28 located at the rear of the wheel and operated simultaneously with the flash breaker. The seater pushes the contacts into the casting until they are seated on the shoulders of the contact receiving apertures. A vertical guide track 30 is also located at the rear of the wheel and has a doctor blade 32 at its upper end which removes the sockets from the wheel after the contacts have been seated whereupon the sockets are gravity fed down the guide track or chute to a ram mechanism 34 which feeds the socket into the contact deforming portion 36 of the machine for deformation of the tails of the contacts. After the tails of contacts have been formed, as desired, the ram mechanism draws the socket out of the deforming mechanism, and the socket is automatically stripped from the ram and dropped into a receptacle or conveyor, not shown, beneath the machine. The ram and deforming mechanism are driven from the main drive of the machine and operate in response to the drive means for advance of the wheel 18. The details of the various portions of the machine will now be described in detail.

*Main drive gearing and control cams*

Figures 9, 12:
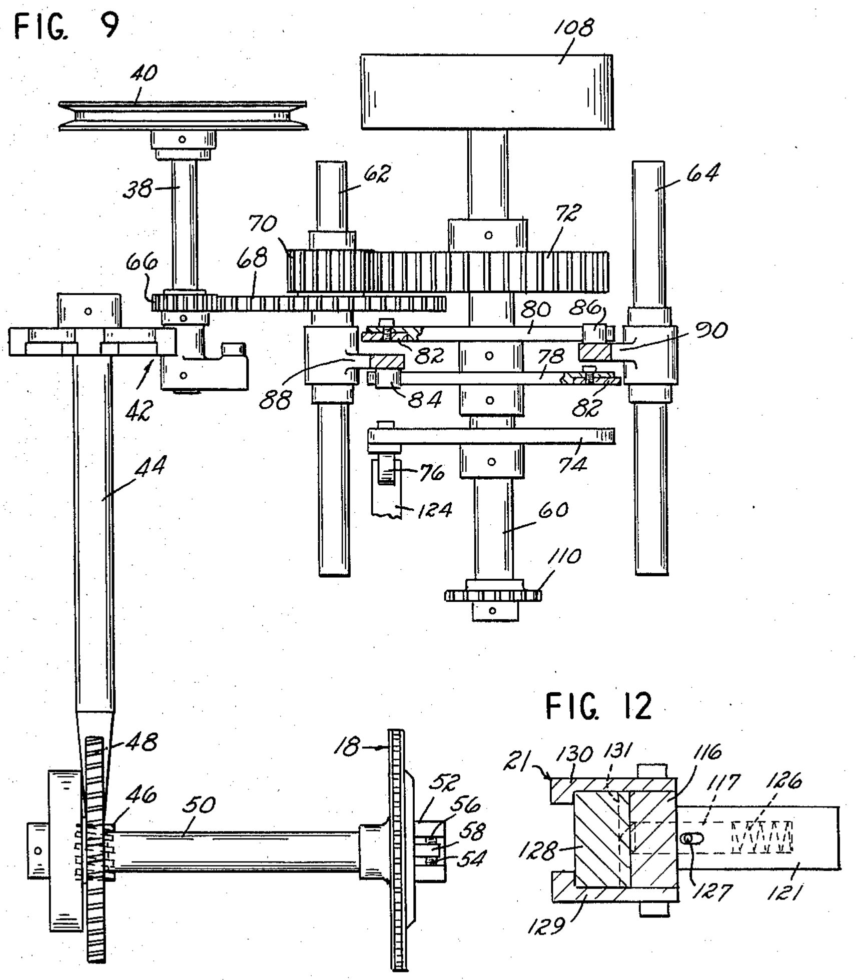
Fig. 9 is a diagrammatic view of the drive mechanism and control cams for a portion of the machine of Fig. 8.
Fig. 12 is a cross-sectional view substantially along the line 12—12 of Fig. 11.
Figure 10:
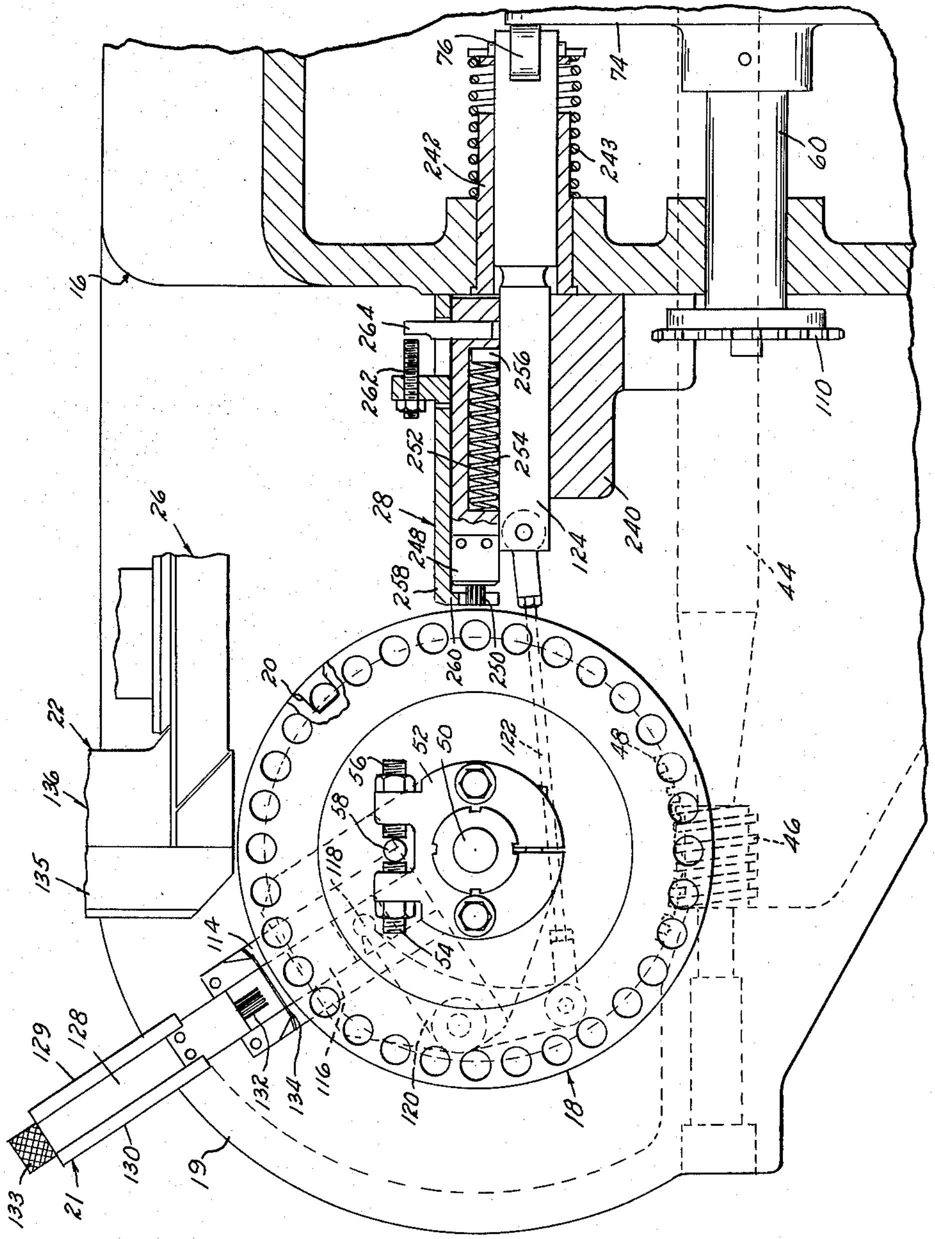
Fig. 10 is an enlarged fragmentary side elevational view, partly in section, of the machine of Fig. 8 showing the details of the contact seating portion of the machine.
Figure 18:
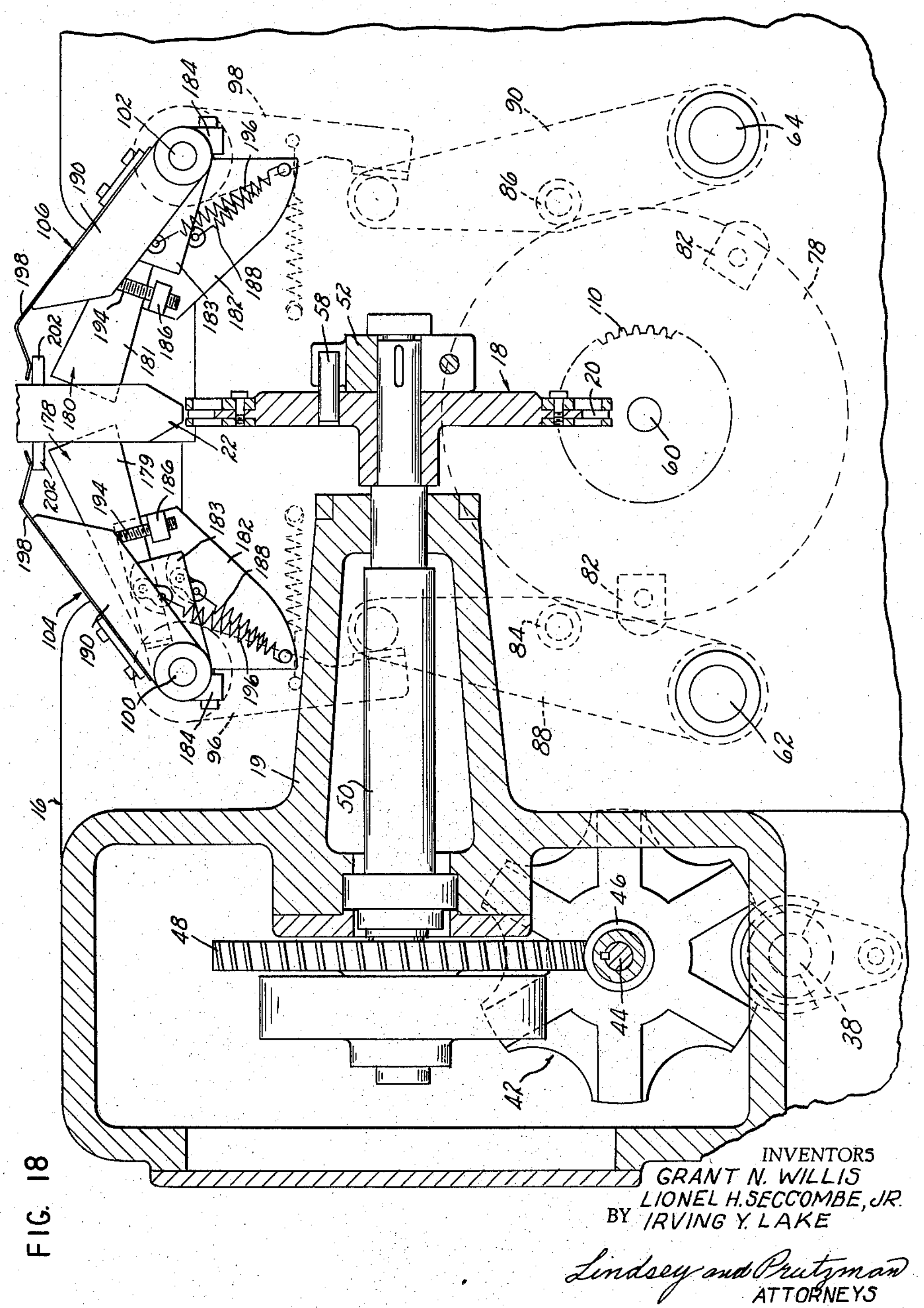
Fig. 18 is an enlarged fragmentary front elevational view of the machine of Fig. 8, partly in section, and with the flash breaker portion removed.

The main drive gearing and control cams are diagrammatically illustrated in Fig. 9. The input to the machine is through a drive shaft 38 on which is mounted a pulley 40 adapted to be drivingly connected to a driving motor, not shown. The drive shaft is connected through a Geneva intermittent transfer motion 42 to a shaft 44 carrying a worm gear 46 engaged with a gear 48 on the shaft 50 carrying the socket carrying wheel 18 to provide discrete indexing of the wheel 18 in steps corresponding to the spacing of the contact receivable apertures in the sockets. The wheel 18 is connected to the shaft for rotation therewith by a collar 52 secured to the end of the shaft and carrying a pair of set screws 54, 56 which as more clearly shown in Figs. 10 and 18 are engageable with opposite sides of a pin or rod 58 extending from the wheel to provide a means for very accurately locating the wheel about the axis of the shaft and properly align the socket receivable recesses of the wheel with the operating stations of the machine.

Extending parallel to the drive shaft 38 is a cam shaft 60 and a pair of rocker arm shafts 62, 64 supported on the main housing. A reduction gear train comprising a pinion 66 on the drive shaft, a gear 68 and pinion 70 rotatably mounted on the rocker arm shaft 62 and a gear 72 mounted on the cam shaft drivingly connects the drive and cam shafts. Mounted on the cam shaft for rotation therewith is a cam 74 engageable with a follower 76 for controlling the operation of the seater portion 28 and flash breaker portion 21 as will be described in more deail.

Also mounted on the cam shaft for rotation therewith are a pair of cams 78, 80 having replaceable cam lobes 82 engageable respectively with followers 84, 86 carried by a pair of rocker arms 88, 90 pivotally mounted on the rocker arm shafts 62, 64. As shown in Fig. 18 the followers 84, 86 are carried intermediate the ends of the rocker arms and the outer ends of the arms respectively are engageable with the outer ends of another pair of rocker arms 96, 98 fixed on shafts 100, 102 oscillatably supported on the main housing and extending forwardly of the main housing 16, as shown in Fig. 8, on opposite sides of the wheel 18. The forwardly extending portions of the rock shafts 100, 102 carry the contact inserting blade portions 104, 106 of the contact inserting portion of the machine which will be described in detail hereinafter.

A brake drum 108 is carried at one end of the cam shaft as shown in Figs. 8 and 9 and a sprocket 110 is mounted on the other end of the cam shaft for rotation with the shaft. The sprocket 110 as shown in Fig. 1 is drivingly engaged by a chain with a drive sprocket 112 for the drive mechanism of the ram and contact deforming portions of the machine. The cam and deforming drive mechanism will be more fully described hereinafter.

*Flash breaker*

Figure 11:
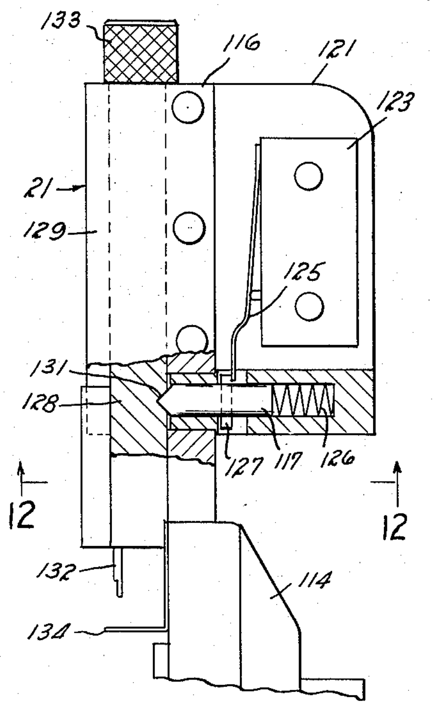
Fig. 11 is an enlarged fragmentary side view, partly in section, of the flash breaker portion of the machine.

The flash breaker 21 is most clearly shown in Figs. 10, 11 and 12 and comprises a support or frame 114 mounted on the forward extension 19 of the main housing. A main slide 116 is mounted on the frame for reciprocation radially of the wheel and the lower end of the slide is connected by a ball and socket joint 118 to one end of a bell crank 120 pivotally mounted on the forward extension 19. The other end of the bell crank is connected by a link 122 to a reciprocable plunger 124 in the seating portion 28 for simultaneous movement therewith. The main slide 116 carries one end of a plunger 117 mounted for movement at right angles to the path of movement of the main slide. The other end of the plunger is slidably carried by a switch housing 121 mounted on the main slide for movement therewith and mounting an electrical switch 123 having an actuating lever 125. A spring 126 in the switch housing biases the plunger toward the slide 116. The plunger carries a pin 127 which is engageable with the switch actuating arm 125 to actuate the switch in response to movement of the plunger to the right, as viewed in Fig. 11.

A second slide 128 is slidably mounted on the main slide between side plates 129, 130 on the main slide and has a notch 131 in which the plunger 117 is engageable to yieldably connect the slides 116, 128 for movement together. A plurality of flash breaking pins or prongs 132 conforming to the configuration of the contact receiving apertures in the socket are carried by the lower end of the slide 128 for insertion into the socket when the slide is moved radially inwardly of the wheel. The upper end of the slide 128 has an enlarged portion or knob 133 which is engageable with the main slide 116 when the notch 131 and plunger 117 are engaged. A hold down plate 134 is mounted on the frame to prevent rising of the sockets on withdrawal of the flash breaking pins.

If upon movement of the main slide and pin carrying slide toward the wheel, a socket is not loaded properly so the narrow slots of the contact receivable aperture are reversely oriented and the pins cannot fully seat in the contact apertures, the movement of the pin carrying slide will be arrested and the main slide will continue to move relative thereto and toward the wheel to cam the plunger 117 out of the notch 131. The movement of the plunger will actuate the switch which in the preferred embodiment of the machine is connected in a suitable electric control system, not shown, to shut down the machine and prevent further operation thereof until the improperly oriented casting is removed and the knob 133 on the pin carrying slide manually pushed down to reset the flash breaker with the plunger 117 and notch 131 engaged to condition the switch for resumption of machine operation.

*Contact inserter*

Figure 14:
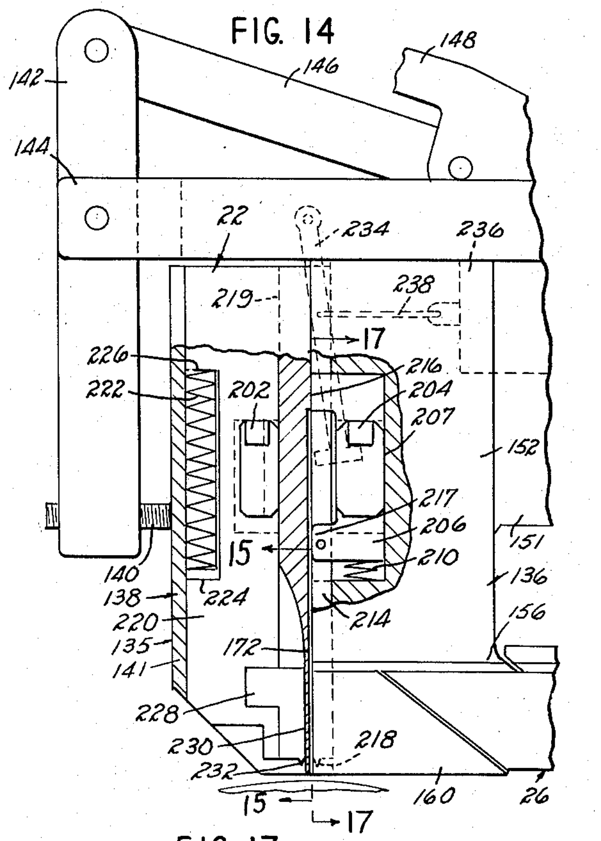
Fig. 14 is an enlarged fragmentary side elevational view of the machine of Fig. 8, partly in section, showing the details of a portion of the contact inserting portion of the machine.

With reference to Figs. 8 and 14 the contact inserter portion 22 comprises an inserting head 135 including a rear body portion 136 supported on the main housing and a front body portion 138 mounted on the rear body by dowels, not shown. The front body portion is held in place by a set screw 140 bearing on a face plate 141 mounted on the front of the front body portion with the set screw being carried by the lower end of a link 142 pivotally mounted between its ends on a bar 144 fixed to the top of the rear body 136. The upper end of the link 142 is connected by a toggle link 146 to a lever 148 pivotally mounted on the bar 144 at one end and having an operating handle at the other end.

Figure 16:
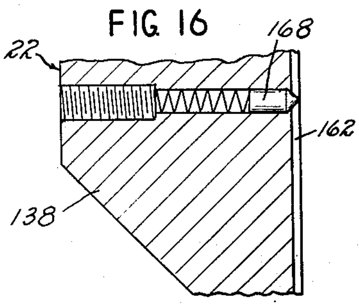
Fig. 16 is a fragmentary cross-sectional view substantially along the line 16—16 of Fig. 15.
Figure 15:
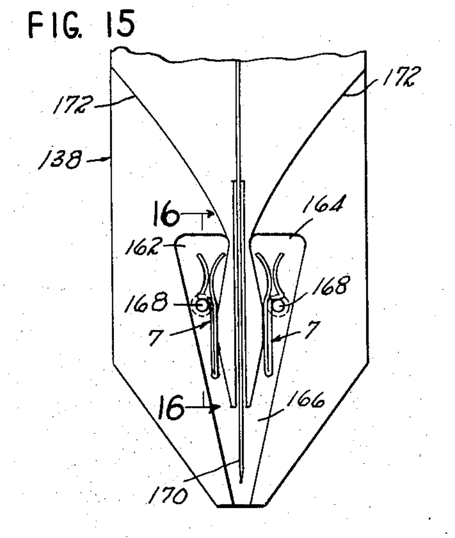
Fig. 15 is an enlarged fragmentary cross-sectional view substantially along the line 15—15 of Fig. 14.
Figure 17:
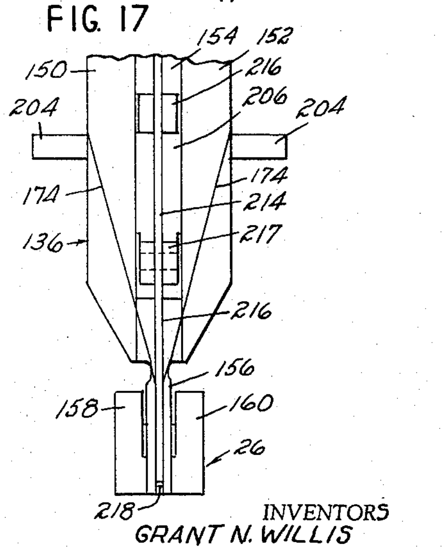
Fig. 17 is a fragmentary cross-sectional view substantially along the line 17—17 of Fig. 14.

As shown in Fig. 17 the rear body section comprises a pair of side plates 150, 152, the side plate 150 having a rearward extension 151 which is supported on the main housing to support the inserter head on the housing. A center plate 154 is sandwiched between the side plates and has a rearward extension 156 forming a continuation of the center rail of the vibratory contact feed rail 26. A pair of rail segments 158, 160 are mounted on the center portion and form continuations of the side rails of the contact feed rail. As shown in Fig. 15 the front body section 138 is provided with a pair of shallow recesses 162, 164 registering with the pair of rows of contacts feeding along the guide rails of the rear section. The recesses 162, 164 are joined at their lower ends to provide a throat 166 through which the contacts pass for insertion into the sockets. A spring pressed button 168 extends through the front wall of each of the pair of recesses 162, 164 as shown in Figs. 15 and 16 and provides a yieldable shoulder on which the shoulder of the end contact in each row rests to prevent its passage through the throat until moved forcibly downwardly in a manner to be described. An elongated thin piece of music wire 170 is carried in a groove in the front section and extends between the recesses 162, 164 and into the throat 166 for a purpose to be described.

Figure 19:
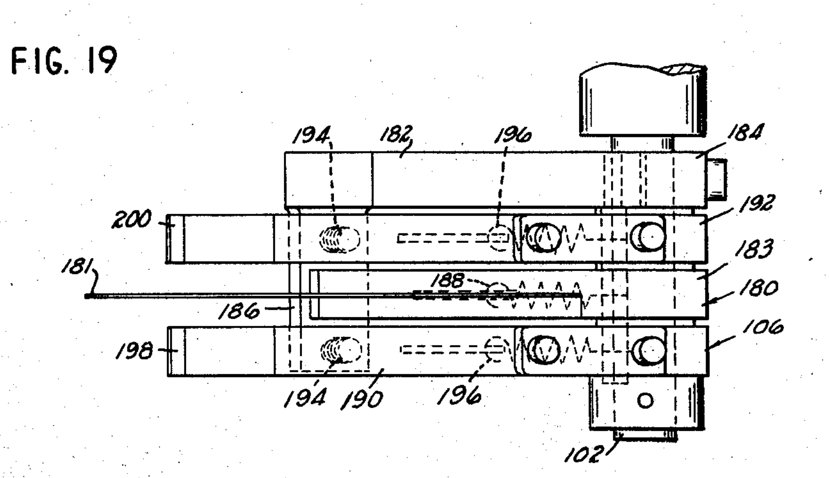
Fig. 19 is an enlarged fragmentary top view of a portion of the contact inserting portion of the machine.
Figure 34:
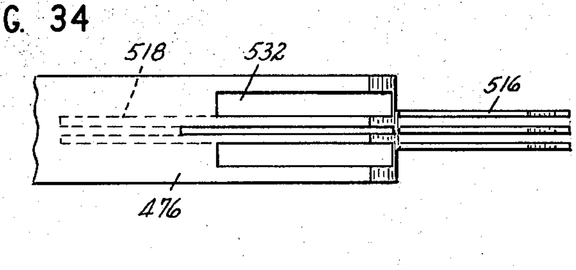
Fig. 34 is a fragmentary top view of one of the deforming elements of Fig. 33.

The adjacent faces of the front and rear body sections are relieved at 172, 174 respectively to provide a clearance between the sections for the reception of a pair of contact inserting blades 178, 180 which as most clearly shown in Fig. 18 are pivotally mounted respectively on the pair of rock shafts 100, 102 mounted on the main housing and extending forwardly thereof on opposite sides of the wheel 18. As shown in Figs. 18–19, the blades comprise relatively thin plate like members 179, 181 mounted on a heavier support or base each having a hub portion 183 pivotally mounted on the associated rock shaft. Also mounted on each rock shaft as shown in Figs. 18 and 19 is a blade actuating lever 182 having a split hub or collar 184 clamped to the associated rock shaft. The blade actuating levers each have an elongated shelf or shoulder 186 extending forwardly of the machine and parallel to the rock shafts and with which the inserter blades are normally engaged by reason of a coil spring 188 connected between the associated blade and actuating lever. As will be apparent from Fig. 18, movement of the blade actuating levers in a downward direction will through the springs 188 result in a like movement of the blades. The cam lobes 82 on the inserter cams 78 and 80 are located relative to each other to provide alternate pivoting of the blades into engagement with the contacts supported on the spring pressed buttons 168 in the front section of the inserter head to move the contacts downwardly and into the socket disposed beneath the head. The cams 78 and 80 and thus the operation of the blades are timed relative to the advance of the socket carrying wheel 18 and with respect to the arrangement of contact receiving apertures in the particular socket involved to assure that the contacts inserted are properly oriented with respect to the narrow slots in the socket apertures. Upon movement of the blade actuating levers in an upward direction the shelf or shoulder 186 will engage the associated blade and move it upwardly to clear the button 168 in the associated recess 162 or 164 in the inserted head to permit the feeding of another contact onto the button 168 by the vibratory feed rail 26.

With further reference to Figs. 18 and 19, a pair of levers 190, 192 are pivotally mounted on each of the rock shafts 100, 102 on opposite sides of the blades 178, 180 and extend radially of the rock shafts and toward the inserter head. Each of the levers 190, 192 is normally engaged with a set screw 194 associated therewith and carried by the shoulder 186 on the blade actuating lever 182 and is urged into engagement with the set screw in a coil spring 196 connecting each of the levers 190 and 192 with the actuating lever 182. The levers 190, 192 have mounted on the tops thereof leaf springs 198, 200, respectively, the outer ends of which are respectively engageable with arms 202, 204 extending outwardly of both sides of the inserter head. The arms 204 at the rear of the head are integral with a slide 206, which as shown in Figs. 14 and 17, is slidably mounted in a recess 207 in the center section 154 of the rear section 136 of the inserter head for movement radially of the wheel 18. The slide 206 has a recess extending longitudinally upwardly thereof in which is received a coil spring 210 engaged at its lower end with the bottom of the recess 207 to bias the slide upwardly and away from the wheel 18. A thin flat metal socket locating member 214 is carried by a pair of forwardly extending projections 216, 218 on the slide 206 and is slidably received in a groove 216 in the center section of the inserter head. The locating member 214 has a small integral pin or projection 218 on its lower end adapted to be engaged in a contact receivable socket aperture for the purpose later described.

As shown in Fig. 14, the front section 138 of the inserter head is provided with a groove 219 longitudinally thereof in which is received a slide 220. A coil spring 222 is mounted between the top and bottom of an enlarged portion 224 of the groove and is also received in a recess 226 in the front of the slide 220 and in engagement with the top of the recess 226 to bias the slide upwardly. The slide carries for movement therewith the arms 202, previously mentioned, and which extend outwardly through recesses in the sides of the front section 138 and are engageable by the springs 198 on the levers 190 to move the slide downwardly or radially inwardly of the wheel 18. The slide 220 also carries a thin flat metal strip 228 at its lower end which is slidably received in a narrow groove 230 in the front section of the inserter head and which has integral with its lower end a small socket locating pin or projection 232.

The points or projections 218 and 232 are provided for selective engagement in the contact receiving apertures of the sockets carried by the wheel 18 to accurately locate the sockets prior to insertion of the contacts. Specifically, the point 232 is engaged in the second contact receiving aperture of the row thereof, prior to the loading of the first aperture in the socket to locate the first aperture in alignment with the contact in the inserter head; in a three aperture socket the point 232 also locates the second aperture by engagement of the point in the third aperture of the socket during loading of the second aperture. The third aperture is accurately located by the engagement of the point 218 in the second aperture after the contact has been inserted. Obviously, it is not desired that both locating slides 206 and 220 be actuated each time a contact inserting blade is actuated. Accordingly, as shown in Fig. 14, an inverted T-shaped lever 234 is pivotally depended from the bar 144, and extends downwardly on one side of the inserter head. The T lever is selectively engageable under one of the arms 202 or 204 to prevent downward movement of the slide 206 or 220, respectively. A solenoid 236 is mounted on the side of the inserter head and the armature thereof connected to the T lever 234 by a link 238. The solenoid is, in the specific embodiment, connected to a suitable electric control, not shown, to position the T lever in engagement with the arm 204 of the rear locating slide except when a socket is positioned under the inserter for insertion of a contact in the last contact receiving aperture in the row thereof.

In the operation of the inserting portion of the machine as a whole, the inserter blades are alternately actuated by the cams 80, 82 with respect to each socket in timed relation to the advance of the wheel, as previously described. As each blade is actuated the levers 190, 192 associated therewith are also actuated simultaneously in a direction corresponding to movement of the socket locating slides 206, 220 downwardly. The T lever 234 maintains the selected one of the slides 206, 220 in its upper position, the spring 198 engaged with this slide permitting continued movement of the associated lever 198 or 200. The set screws 194 on the blade actuating lever and which are engageable with the levers 190, 192 provide a means to time the engagement of the locating points 218, 232 with the sockets relative to engagement of an inserter blade and contact to assure proper location of the socket prior to insertion of the contact.

The inserter blade actuated will engage the top of the associated contact on the yieldable seat 168 and move it downwardly into the socket, the wire 170 guiding the contact in its movement through the bottom of the inserter head and maintaining it in proper vertical position. The blades will insert the contacts in the sockets with the top of the contacts preferably flush with the top of the socket and with the lateral shoulder on the contact spaced from the lateral seat in the socket aperture.

The inserter portion of the machine thus provides a means to accurately locate a socket prior to insertion of a contact therein and to insert contacts in the socket in alternately reversed orientation relative to the socket. The inserter portion is capable of high speed operation without jamming, for example, in a five contact socket, operation at speeds up to 300 contacts per minute has been achieved. In the rare case where jamming of the inserter might occure due to an irregular contact or the like, the jam may be easily cleared by merely lifting the handle of the lever 148 to remove the front section of the inserter head. As shown in Fig. 8, an electrical switch is supported on the machine adjacent to and engageable by a flange on the pivoted end of the lever 148, with the switch being adapted to be connected to the drive for the vibrating feed rail 26 to deenergize the rail whenever the lever 148 is pivoted to disassemble the inserter head.

*Seater mechanism*

With reference to Fig. 10, the seater mechanism comprises a plunger 124 carrying at its rear end the cam roller 76 engaged with the seater cam 74. The plunger is slidably mounted at its forward end in a guide block 240 mounted on the main housing 16 and is slidably mounted at its rear enlarged end in a bushing or sleeve 242 supported on the main housing. A spring 243 engaged between the main housing and a washer on the rear end of the plunger biases the plunger toward the cam 74. Slidably mounted in the guide block immediately above the plunger is a seater slide 248 carrying a plurality of prongs or pins 250 at its forward end engageable in the contact receiving apertures of a socket to seat contacts, previously inserted therein, with the lateral shoulders of the contacts and apertures engaged. The seater slide has an elongated recess 252 in its bottom in which is received a coil spring 254 engaged at one end with the forward end of the recess and at its other end with a pin 256 extending upwardly from the plunger to provide a resilient driving connection between the plunger and seater slide. A plate-like member 258 is fixed to the top of the block and has a depending bifurcated flange 260 at its forward end forming a hold down plate engageable with the sockets to prevent rising thereof on withdrawal of the contact seating pins. A stop screw 262 is carried by an upstanding flange on the rearward end of the plate 258 and is engageable with a stop pin 264 extending at right angles upwardly from the seater slide and through an elongated recess in the plate 258. As will be apparent from the above description, camming of the plunger to the left as viewed in Fig. 10 will resiliently drive the seater slide to the left to seat the contacts in an aligned socket. Movement of the slide is limited by the stop pin 264 and screw 262 while the spring 254 permits additional movement of the plunger 124 as necessary to operate the flash breaker 21 through the link 122 connecting the flash breaker and the plunger.

*Ram mechanism*

Figure 20:
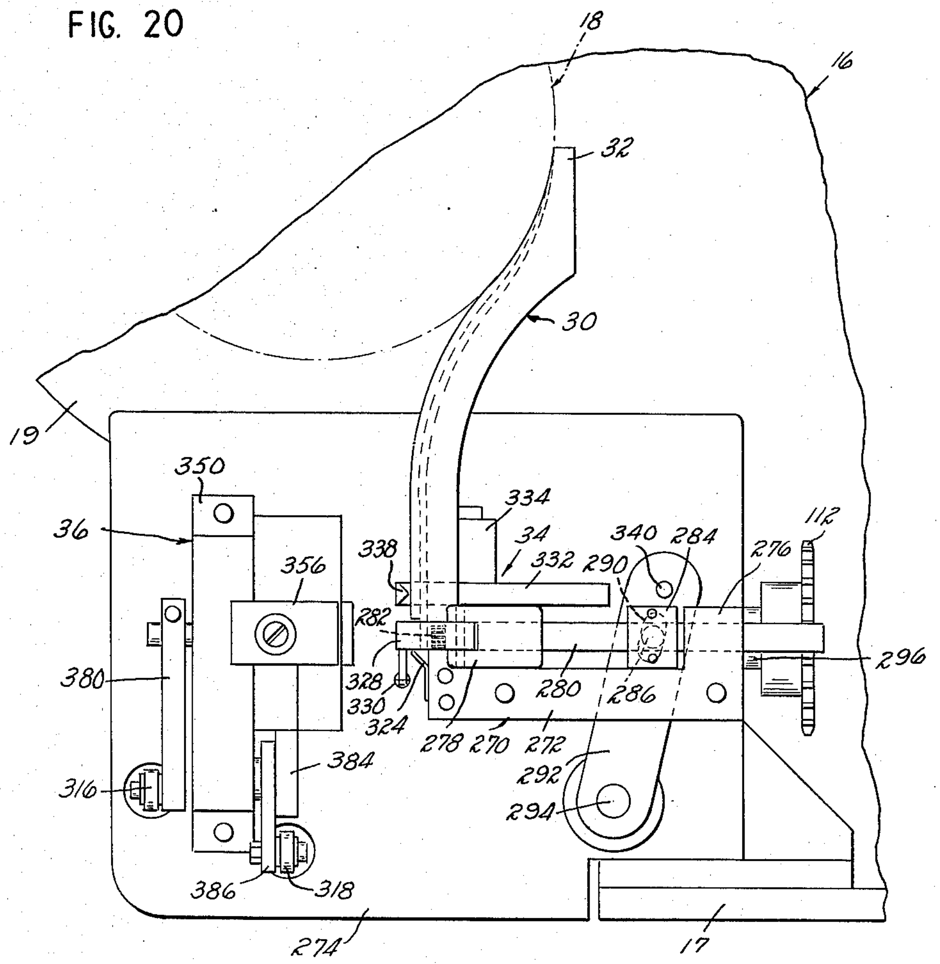
Fig. 20 is an enlarged fragmentary side elevational view of the machine of Fig. 8 showing the contact deforming mechanism for forming the contact configuration of Fig. 5 and a ram mechanism associated therewith.
Figure 23:
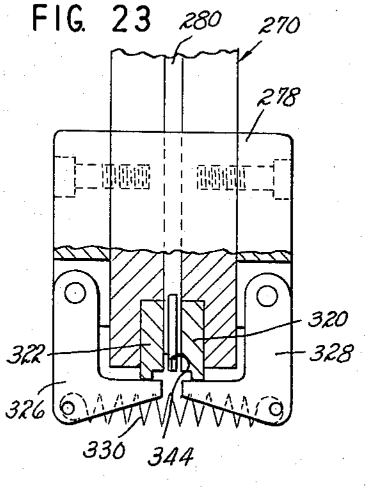
Fig. 23 is an enlarged fragmentary top view, partly in section, of the ram mechanism of Fig. 20.

The ram mechanism 34 for loading sockets into the contact deforming portion 36 is most clearly shown in Figs. 20, 23 and comprises a U-shaped support or frame 270 having a base 272 bolted to one side of the vertical wall 274 mounted on and extending upwardly from the table 17. The frame also includes a pair of upright guide blocks 276, 278 in which is slidably received a ram 280 having a plurality of prongs or fingers 282 at its forward end engageable in between the gripping arms of contacts in a socket aligned therewith. A block 284 is mounted on the rear end of the ram for movement therewith and carries a pin 286 engaged in a slot 290 in a lever 292 fixed on a shaft 294 extending through the wall 274 and carrying a second lever 276 disposed on the other side of the wall and fixed to the shaft 294, as shown in Fig. 21.

Also disposed on the other side of the wall, is a cam shaft 296 journalled in spaced apart supports extending from the wall and carrying the sprocket 112, previously described, for driving connection to the main drive of the machine enclosed in the main housing 16. A cam 298 is mounted on the cam shaft 296 for rotation therewith and is engageable with a cam follower 300 on the lever 276 to control reciprocation of the ram. A pair of springs 300, 302 bias the lever 276 toward the cam with the spring 300 being substantially stronger than the spring 302 and being of a free length whereby it will go slack prior to full extension of the ram, for a purpose to be described. Also mounted on the cam shaft 296 for rotation therewith are a pair of cams 304, 306, which as will later be seen, control the operation of the contract deforming mechanism. A pair of levers 308, 310 are pivotally mounted on a shaft extending between a pair of spaced apart supports on the wall 274 and the levers carry followers 312, 314 engaged with the cams 304, 306. A pair of rods 316, 318 are connected to the cam follower levers 308, 310 and extend through the wall 274 for connection to the deforming mechanism, to be described.

Figure 22:
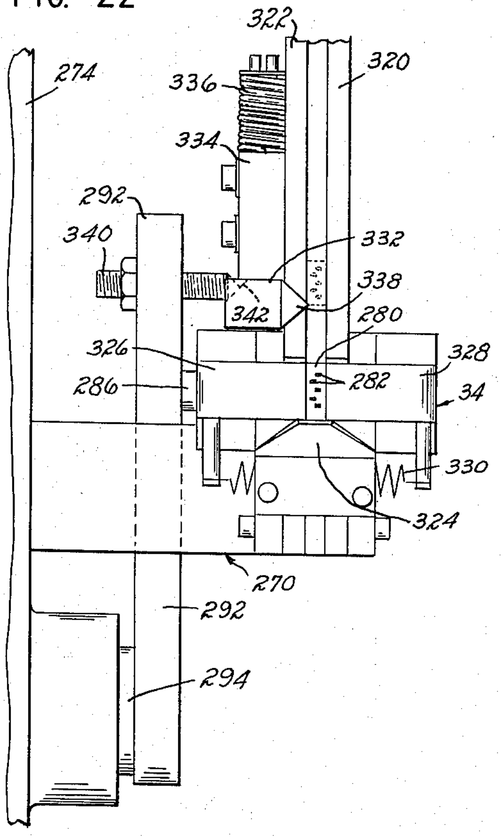
Fig. 22 is an enlarged end view of the ram mechanism of Fig. 20.

With reference to Figs. 22 and 23 the sides 320, 322 of the guide track 30 extend downwardly through the forward guide block 278 of the ram frame and the forward end of the ram is slidable therebetween to pick up a socket in registry therewith. A stop plate 324 is mounted on the front of the frame and, as shown in Figs. 20 and 22, has an upper end positioned for engagement with a socket to position it in alignment with the ram. A pair of L-shaped stripper levers 326, 328 are pivotally mounted on opposite sides of the guide block 228 with the shorter legs of the levers extending in opposite directions across the front of the ram. The stripper levers in cooperation with the lower ends of the sides of the guide channel and the stop plate 324 form a seat for receiving a socket for pick-up by the fingers on the ram. The stripper levers are biased toward each other by a spring 330 connected therebetween and thus provide a yieldable backing member or wall for a socket during insertion of the ram fingers into the socket. The combined forces of the springs 300, 302 biasing the lever 276 which carries the ram follower are sufficient to seat the ram fingers in the socket and move the socket past the stripper levers for insertion in the deforming mechanism. It is preferred that the stronger spring 300 go slack upon movement of the socket past the stripper arms so that only the force of the lighter spring 300 is available to seat the socket in the deforming mechanism 36, thus minimizing the danger of fracture of the socket because of too forceful a seating. The stripper arms are also, of course, engageable with the socket upon retraction of the ram, subsequent to the deforming operation, to strip the socket from the ram, whereupon it will fall into a conveyor or receptacle, not shown, under the ram.

Figure 21:
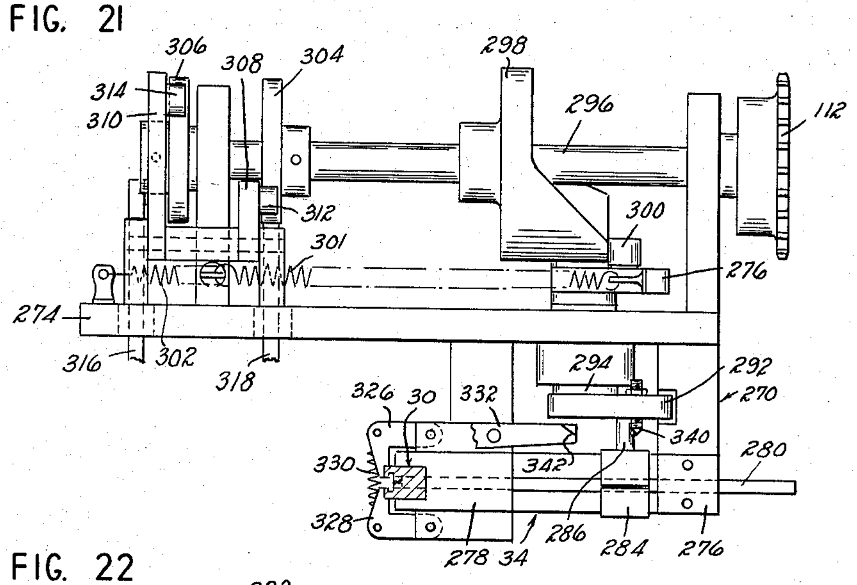
Fig. 21 is a top view of the ram mechanism of Fig. 20 and the cam control mechanism therefor.

As shown in Figs. 20, 21 and 22, a bar 332 is disposed above the ram and has a pivot extending upwardly at right angles thereto and through a mounting block 334 on the guide track 30. A torsion spring 336 is mounted on the upper end of the pivot and biases the bar in a counter clockwise direction as viewed in Fig. 21. The bar is provided with a nose portion 338 at its forward end which projects in front of the guide track 30 and is engageable with a socket in the guide track to form an escapement therefor. The escapement is operated by a set screw 340 carried at the upper end of the ram actuating lever 292 and engageable with an inclined cam surface 342 at the rear end of the bar to pivot the bar in a clockwise escaping direction subsequent to forward movement of the ram underneath the escapement so that a socket escaped thereby will drop down on top of the ram. Upon subsequent retraction of the ram the socket will drop into the seat provided by the lower end of the guide rail sides, the stop plate and the stripper levers for pick-up by the ram on its next forward movement.

In the operation of the ram mechanism, the ram is extended by the springs 300, 302 to seat the fingers thereof on a socket seated in alignment therewith. The ram is provided with a shoulder 344 at the inner end of each of its fingers which is engageable with the top of the contacts in the socket to maintain the contacts in fully seated position during subsequent deforming. Continued movement of the ram then moves the socket beyond the stripper levers and into the deforming mechanism. When the fingers of the ram clear the socket seat in the ram mechanism, the escapement 332 is actuated to drop any socket held thereby onto the top of the ram where it rests until the ram is subsequently retracted beyond he socket seat in the ram mechanism to permit the socket to fall into the seat. As previously mentioned, the ram will on retraction carry the socket, with the deformed contacts, until the socket is stripped therefrom by the stripper levers 326, 328 whereupon the socket may fall into a receptacle or the like.

*Contact deforming mechanism*

The contact deforming mechanism, as heretofore mentioned, may take a variety of forms dictated by the particular configuration it is desired to provide to the tails of the contacts. In the embodiment shown in Figs. 8 and 20 the deforming mechanism is of a type adapted to provide the twisted tails of Fig. 5. However, if desired, deforming mechanisms of a type for providing the offset tail configuration of Fig. 6 or the reversely bent configuration of Fig. 7 may be substituted for the twister type mechanism.

Figure 24:
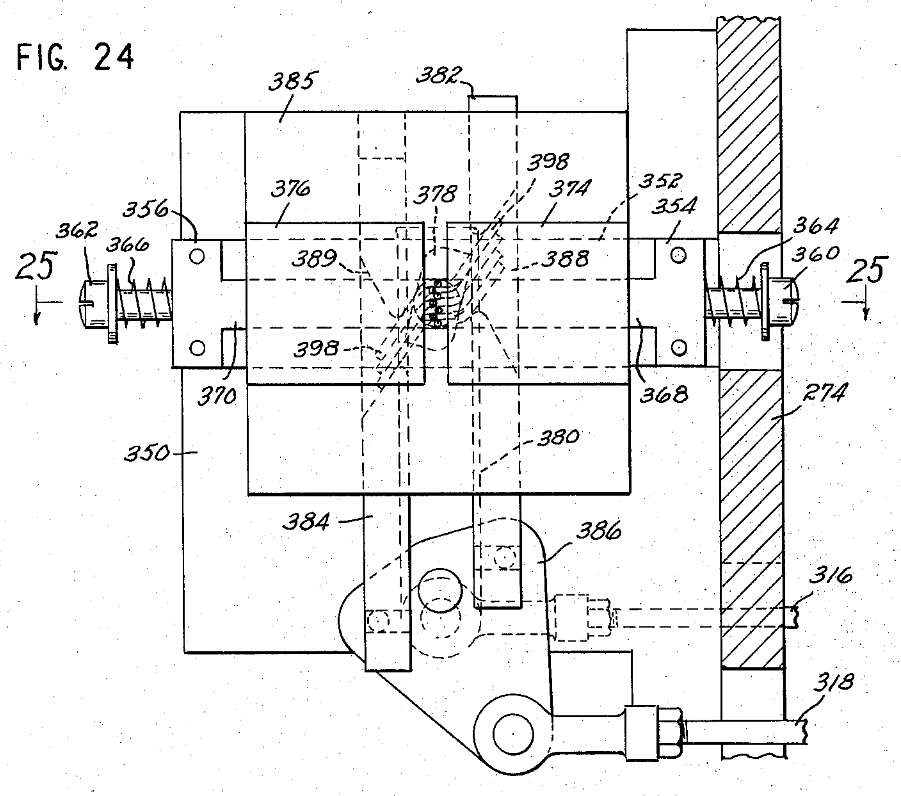
Fig. 24 is an enlarged front elevational view of the contact deforming mechanism of Fig. 20.
Figure 25:
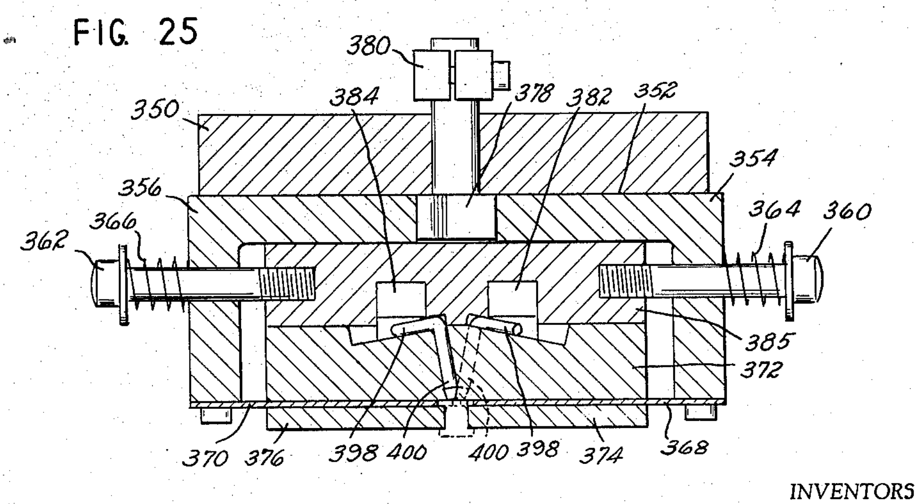
Fig. 25 is a fragmentary cross-sectional view substantially along the line 25—25 of Fig. 24.

With reference to Figs. 20 and 24–27, the twister mechanism comprises a base 350 mounted on the depending wall 274 in vertical position and provided with a groove 352 in which are received a pair of L-shaped slides 354, 356 for movement in a horizontal plane at right angles to the path of movement of the ram 280, previously described. Mounted on the base as shown in Fig. 25 is a guide block 385 in which is received a pair of bolts 360, 362 extending through the arms of the slides. A pair of coil springs 364, 366 on the bolts bias the slides 354, 356 inwardly of the guide block and toward each other. A pair of back-up plates 368, 370 are carried by the upstanding flanges of the slides 354, 356 and are slidably received between a die block 372 mounted on the guide block 358 and a pair of cover plates 374, 376. A cam 378 is engaged between the spaced apart ends of the slides 354, 356 and has a shaft oscillatably mounted in the base and at its outer end connected by a lever 380 to the cam rod 316 which as previously described is controlled by the cam 306. The next adjacent inner ends of the back-up plates 368, 370 are, as shown in Fig. 24 provided with interfitting fingers and notches between which may be engaged the tails of a contact, seated on the cover plates as shown in Fig. 25, to back up the tails during a twisting thereof and assure that the portions thereof within the socket will not be twisted so as to fracture the socket.

A pair of twister slides 382, 384 are mounted in recesses in the guide block 358 and die block 372 for movement in a vertical plane at right angles to the back-up plates. The twister slides are pivotally connected at one end by a pin and slot connection to a plate-like lever 386 pivoted on the base 350 with the slides connected on opposite sides of the plate pivot. The lever 386 is pivotally connected to the rod 318 extending through the wall 274 of the machine and connected in turn to the cam follower lever 308, previously described for simultaneous movement of the twister slides in opposite directions.

Figures 26, 27, 28:
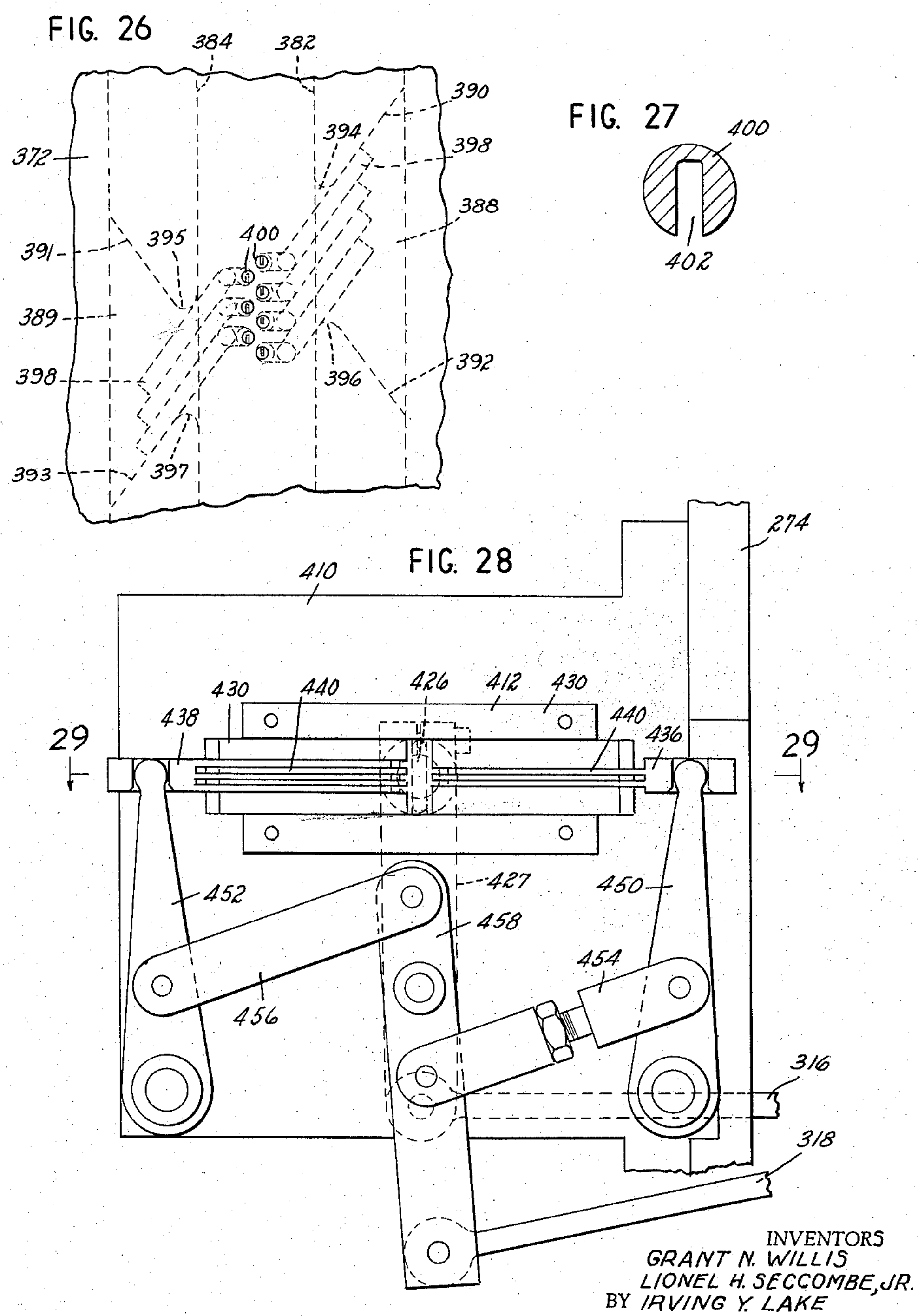
Fig. 26 is an enlarged fragmentary front elevational view of a portion of the mechanism of Fig. 24.
Fig. 27 is an enlarged cross-sectional view of a portion of one of the contact deforming elements of the mechanism of Fig. 26.
Fig. 28 is a front elevational view of a contact deforming mechanism for providing the contact configuration of Fig. 6.
Figure 29:
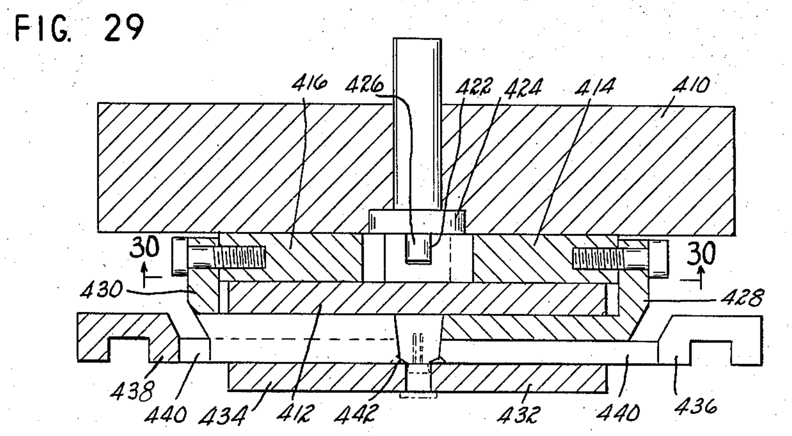
Fig. 29 is a cross-sectional view substantially along the line 29—29 of Fig. 28.
Figure 30:
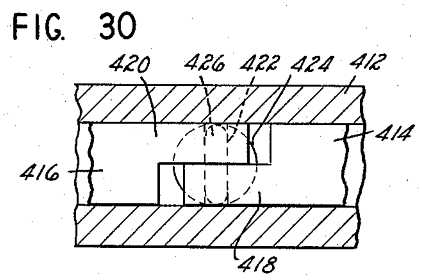
Fig. 30 is a fragmentary cross-sectional view substantially along the line 30—30 of Fig. 29.

As most clearly shown in Fig. 26 the twister slides are provided with recesses 388, 389 in the face thereof having sides 390, 392 and 391, 393 inclined inwardly of the die block and toward each other. The inner ends of the sides of the recesses are rounded to provide nose portions 394, 396 and 395, 397 oppositely directed longitudinally of the slide. Received in each of the recesses are a plurality of crank arms 398 of a plurality of twister dies 400 oscillatably mounted in the die block 372 and extending angularly outwardly from the socket seat formed by the cover plates 374, 376.

The number of dies and thus crank arms is of course dictated by the number of contacts in the particular socket concerned. In the specific embodiment shown the twister is adapted for use with a seven contact socket. Accordingly seven dies are provided with four of the dies being offset laterally of the socket seat from the remaining three dies disposed therebetween to correspond to the staggered arrangement of the tails of the contacts in the socket. The set of four dies are inclined outwardly of the socket seat in the direction opposite that of the intermediate three dies. Each die is provided with a groove 402 longitudinally thereof as shown in Fig. 27 in which the tail of a contact is receivable, the opposite outward inclination of the dies spreading the next adjacent contact tails apart as the contacts are inserted in the dies. The crank arms of the dies are juxtaposed in the recesses 388, 389 of the twister slide and with the set of four arms engaged between the inclined side 390 of the recess 388 and oppositely facing nose 396. The crank arms of the set of three dies are engaged between the inclined side 393 of the recess 389 and oppositely facing nose 397 and extend parallel to and in the opposite direction relative to the other set of crank arms in the recess 388.

In the operation of the twister mechanism a socket is first inserted by the ram 280 in the seat formed by the ends of the cover plates; the cam 306 then rotates the cam 378 to permit the springs to engage the back-up plates with the tails of the contacts at a point closely adjacent the bottom of the socket. The cam 304 controlling the twister dies then simultaneously moves the dies in opposite directions outwardly of the guide block to cam the crank arms of the twister dies in a clockwise direction as viewed in Fig. 26 twisting the contact tails approximately 45 degrees about their longitudinal axes. The cam 306 then moves the hold-down plates outwardly and the ram withdraws the socket. The cam 304 then returns the twister slides and dies to their starting position in preparation for insertion of another socket. The operation of complete cycle of the twister mechanism as well as a complete loading and withdrawal cycle of the ram mechanism takes place within one revolution of the cam shaft 296. In the specific embodiment the ram and twister mechanisms are operated at a speed correspondingly greater than the speed of operation of the remainder of the machine to avoid the piling up of sockets in the feed chute 30 to the ram.

With reference to Figs. 28–31 a mechanism for deforming the tails of the contacts to provide the offset configuration shown in Fig. 6 comprises a base 410 adapted to be mounted in vertical position on the depending wall 274 of the machine and a guide block 412 mounted on the base and provided with a groove extending at right angles to the path of the ram 280 and in which is received a pair of slides 414, 416. The slides have oppositely extending fingers or cam followers 418, 420 at the inner ends thereof and each follower has a groove 422 extending transversely thereof and alignable with the groove in the other follower. A cam 424 is oscillatably mounted on the base and has a diametrically extending projection or rib 426 engageable in both grooves 422 of the followers to move the slides 414, 416 simultaneously outwardly or inwardly of the base in response to oscillation of the cam 424. A lever 427 connected to the cam 424 is adapted to be connected at its other end to the rod 316 connected to a suitable cam carried by the cam shaft 296 previously described.

Figure 31:
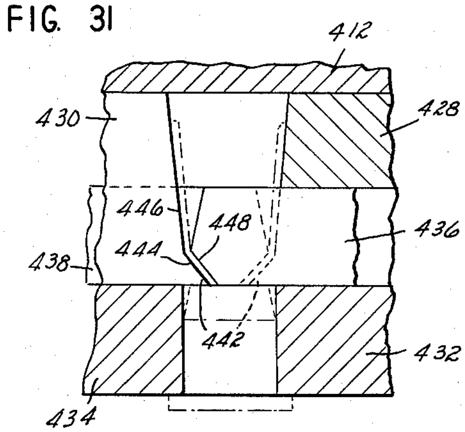
Fig. 31 is an enlarged fragmentary view of a portion of the mechanism as shown in Fig. 29.
Figure 32:
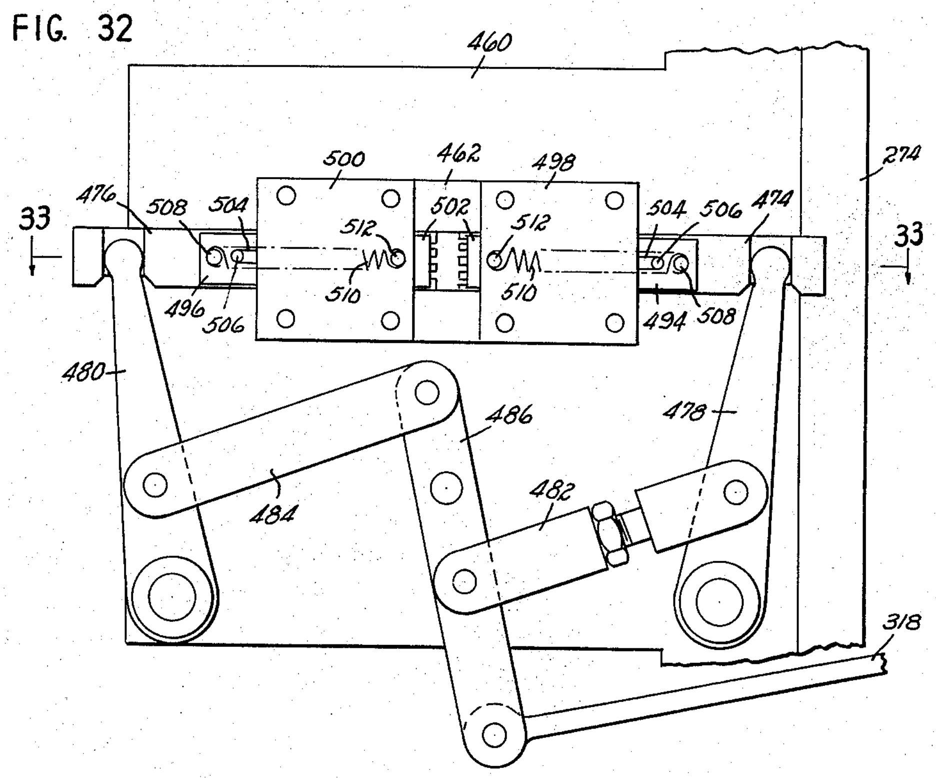
Fig. 32 is a front elevational view of a contact deforming mechanism for providing the contact configuration of Fig. 7.

A pair of back-up dies 428, 430 are also slidably mounted on the guide block and connected to the slides 414, 416 respectively for movement therewith. A pair of cover plates 432, 434 retain the back-up dies on the guide block and the spaced apart inner ends thereof are engageable with the underside of the top flange of a socket as shown in Fig. 31 to provide a seat for the socket on the deforming mechanism. The back-up dies each have a plurality of parallel grooves extending longitudinally thereof and laterally offset relative to the grooves in the other die. A pair of deforming dies 436, 438 each having a plurality of parallel spaced-apart elongated fingers 440 are carried by the back-up dies with the fingers of the deforming dies slidably received in the lonigtudinal grooves of the back-up dies. The inner end of each of the back-up dies is cut back to provide a sharp lip 442 extending laterally of the die and to provide a pair of die surfaces 444, 446, at the end of the dies, as shown in Fig. 31, generally conforming to the desired offset of the contact tails. The inner ends of the fingers of the deforming dies are aligned with the lips 442 of the back-up dies and are each provided with a pair of surfaces inclined in opposite directions laterally of the fingers with the one surface 448 being generally complimentary to the underside 444 of the oppositely facing lip 442 of the associated back-up die.

The outer ends of the deforming dies are provided with transverse grooves in which are pivotally engaged the ends of a pair of levers 450, 452 pivotally mounted at their other ends on the base 410. A pair of links 454, 456 are connected at one end between the ends of the levers 450, 452 and at their other ends to a rocker arm 458 pivoted on the base with the links mounted on opposite sides of the rocker arm pivot. The lower end of the rocker arm is adapted to be connected to the rod 318 which extends through the wall 274 and is connected to the cam follower lever 308, as previously described.

In the operation of the offset deforming mechanism, the socket is seated on the cover plates as shown in Fig. 31 by the ram 280, previously described. The cam 306 is then actuated to simultaneously move the back-up dies 428, 430 inwardly toward each other until the lips 442 thereof engage the contact tails. The deforming dies 436, 438 are then simultaneously moved inwardly toward each other and relative to the back-up dies to engage the contacts and, in cooperation with the back-up dies, to deform them to the offset configuration described, as shown in Fig. 31.

With reference to Figs. 32–37, a mechanism for deforming the tails of a contact in the reversely bent configuration of Fig. 7 comprises a base 460 adapted to be fixed in vertical position to the wall 274 of the machine and a guide block 462 mounted on the base. A back-up die 464 is slidably mounted on the base for movement in alignment with the path of movement of the ram 280, previously described, and extends into a slot through the guide block 462. The back-up die is provided with a pair of shoulders 466, engageable with the guide block to limit movement of the die inwardly of the block. The outer end of the die is connected by a pin and slot connection 468 to one end of a bell crank 470 pivotally mounted on a support 472 fixed to the base. The other end of the bell crank is adapted to be pivotally connected to the rod 318 extending through the wall 274 and associated with the cam follower lever 310, previously described, for movement of the back-up die inwardly and outwardly of the guide block.

Figure 33:
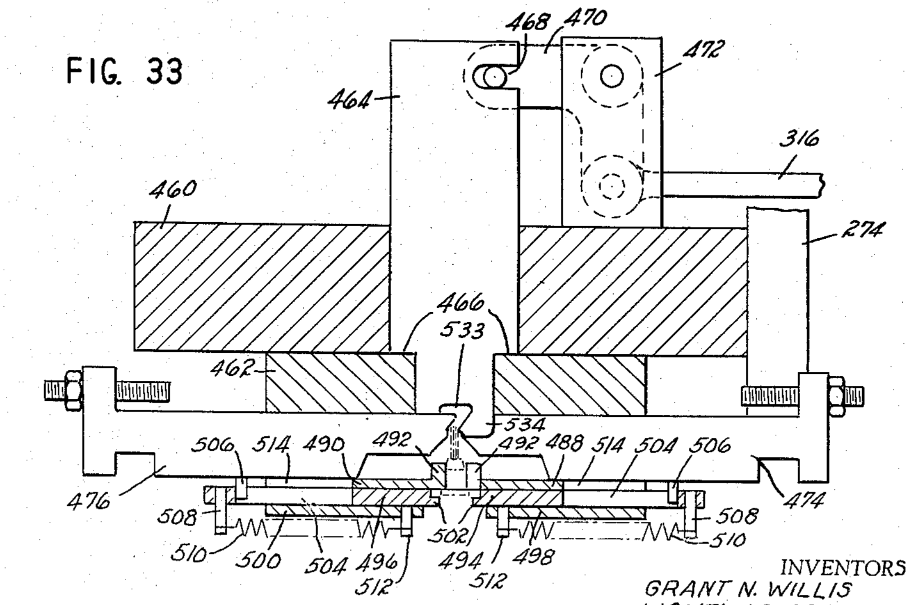
Fig. 33 is a cross-sectional view substantially along line 33—33 of Fig. 32.

The guide block is provided with a T-slot extending parallel to the base 460 and into which the inner end of the back-up die projects when the die is in its inward position of Fig. 33. A pair of deforming dies 474, 476 are slidably mounted in the T-slot and are pivotally connected at their outer ends to a pair of pivoted levers 478, 480 mounted on the base. The levers are connected by links 482, 484 to a rocker arm 486 pivotally mounted on the base with the links connected on opposite sides, respectively, of the rocker arm pivot. The rocker arm is adapted to be pivotally connected to the lever 316 connected to the cam follower lever 308, previously described, for simultaneous movement of the deforming dies inwardly or outwardly of the guide block. A pair of set screws carried by the outer ends of the dies are engageable with the sides of the guide block to limit inward movement of the dies to a predetermined adjustable position.

A pair of face plates 488, 490 are mounted on the guide block over the deforming dies and each has a plurality of spaced-apart depending flanges 492 at their inner ends providing a seat for a socket, as shown in Fig. 33. A pair of hold-down plates 494, 496 are slidably mounted between the face plates and a pair of cover plates 498, 500 fixed to the guide block. The hold-down plates are each provided with a lip 502 engageable over the top of a socket to retain the socket in seated position, as shown in Fig. 33. Each hold-down plate is further provided with an elongated slot 504 extending longitudinally of the deforming dies in which is received a pin 506 on the deforming die located thereunder. Each hold-down plate also carries a pin or post 508 connected to one end of a coil spring 510, the other end of the spring being connected to a fixed post or pin 512 on the associated cover plate. The springs 510 urge the hold-down plates toward each other while the pins 506 on the deforming dies are engageable with the outer end of the slots 504 in the hold-down plates to move the plates away from each other in response to movement of the deforming dies outwardly of the guide block. A slot 514 in each face plate accommodates the pins 506 on the deforming dies during movement of the dies relative to the face plates. The pins 508 on the hold-down plates are engageable with the outer ends of the cover plates to limit inward movement of the hold-down plates while the slots 504 in the hold-down plates are of sufficient length to permit additional inward movement of the pins 506 and thus the deforming dies, subsequent to engagement of the pins 508 with the ends of the cover plates.

Figure 35:
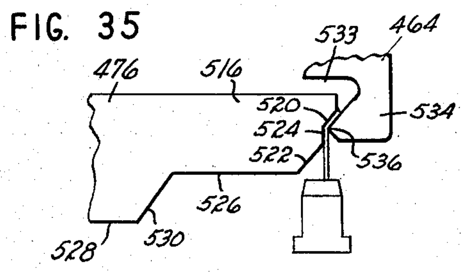
Figs. 35–37 are fragmentary views of the deforming elements of the mechanism of Fig. 28 showing the operation thereof in providing the contact configuration of Fig. 7.

The deforming dies are each provided with a plurality of laterally spaced apart fingers 516 extending longitudinally thereof from its inner end which are formed by slots in the die with the slots extending as grooves 518 in the underside of the die body. Each finger 516 is shaped at its distal end to provide a pair of bearing or cam surface 520, 522 inclined laterally of the die, and a surface 524 extending laterally of the die and joining the inclined surfaces 520, 522. As shown in Fig. 35, the top surface 526 of the fingers is offset laterally of the die from the top 528 of the die and is joined thereto by an inclined surface 530. The top of each die is provided with a plurality of grooves 532 substantially aligned with the fingers 516 and in which the depending flanges 492 of the associated face plate are receivable. In the specific embodiment shown, the dies are adapted for use with a five contact socket and the die 476 has three fingers 516 while the other deforming die 474 is similar to the die 476 just described with the exception that, it has only two fingers 516 extending from its inner end but has three grooves in its underside to accommodate the three fingers of the die 474. The dies are mounted in the guide block with the fingers of the die in alignment with and receivable within the space between the fingers of the other die and the aligned grooves in the underside of the die.

The back-up die 464 is provided with a recess 532 in its inner end and its inner end is slotted laterally of the die to provide a plurality of spaced apart parallel ribs 534 on opposite sides of the recess and extending parallel to the finger 516 on the deforming dies. The ribs 534 are shaped at their inner ends to provide a sharp nose 536. The ribs 534 are of a number and arranged so that a rib is disposed in alignment with each deforming die finger 516 with the nose 536 of the rib facing oppositely the associated finger 516, as shown in Figs. 33 and 35.

Figure 36:
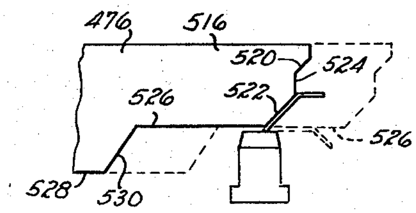
Figure 37:
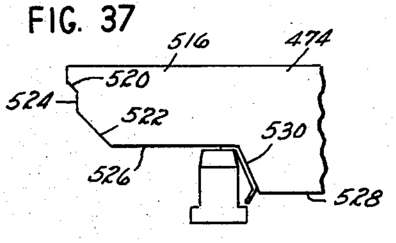

In the operation of the reverse bending mechanism the socket is first inserted by the ram mechanism, previously described, in the seat formed by the face plates. The back-up die is then moved inwardly and into the groove of the guide block by the cam and linkage connected thereto to take the position shown in Figs. 33 and 35. The deforming dies are then moved inwardly through the linkage and cam connected thereto until the ends of the tails of the contacts are engaged between surfaces 520, 524 of the fingers 516 of the deforming dies and the noses 36 of the back-up die to bend the ends of the tails outwardly as shown in Fig. 35. The initial inward movement of the deforming dies permits the springs 498 to move the hold-down plates over the socket, and the deforming engagement of the dies and contacts takes place subsequent to the engagement of the pins 508 on the hold-down plates and the outer ends of the cover plates. The cams controlling the back-up and deforming dies then move the dies outwardly, the movement of the deforming dies being insufficient for the pins 506 thereon to engage and move the hold-down plates outwardly while the back-up die is moved completely out of the "T" slot in the guide block in which the deforming dies are mounted. The deforming dies are then again cammed inwardly whereupon the contacts are engaged by the ends of the die fingers and bent outwardly until they lie along the inclined surfaces 522 at the end of the fingers as shown in Fig. 36. Continued inward movement of the dies will bend the contacts still further outwardly until they lie along the top 526 of the fingers also as shown in dotted lines in Fig. 36. The inclined surface 530 adjacent the top of the oppositely moving die will then pick up the initially bent over end of the tail of the contact and during the final inward movement of the die will bend the tail alongside the socket as shown in Fig. 37. The cam controlling the deforming dies then moves the dies fully outwardly to retract the hold-down plates, and the socket is removed by the ram mechanism.

*Summary*

It is believed that the overall operation of the machine is fully described in the operational summary provided in the forepart of the above descripion taken in connection with the detailed structural and operational description of the individual components of the machine. Accordingly, a further descripion of operation of the machine is unnecessary.

While the structure and operation of the machine have been described in connection with a socket and contacts of a particular configuration, it is to be understood that the invention is not limited to the specific socket and contact described but rather is adapted for use with a variety of socket-conatct configurations.

We claim:

1. In a machine for automatically assembling contacts in sockets and the like with portions of the contacts extending outwardly of the sockets, an indexable work carrier adapted to carry a plurality of sockets of the type each having a plurality of contact receivable apertures, means to index the carrier discretely in increments corresponding to the spacing of contact receivable apertures in a socket, contact inserting means disposed along the path of movement of the carrier for inserting contacts one at a time into socket apertures in registry therewith, means to operate the inserting means in timed relation to the advance of the carrier, contact seating means disposed along the path of movement of the carrier for seating contacts in a socket subsequent to inserting of the contacts by the inserting means, means for engaging the seating means once with each socket in timed relation to the advance of the carrier, means responsive to indexing of the carrier to remove sockets from the carrier subsequent to seating of the contacts, contact deforming means for deforming the outwardly extending portions of contacts seated in sockets to retain the contacts in the sockets, means to deliver the sockets from the socket removing means to the deforming means, and means to operate the deforming means in response to operation of the carrier indexing means.

2. In a machine for automatically assembling contacts in sockets and the like with portions of the contacts extending outwardly of the sockets, and indexable work carrier adapted to carry a plurality of sockets of the type each having a plurality of contact receivable apertures, means to index the carrier discretely in increments corresponding to the spacing of contact receivable apertures in a socket, contact inserting means disposed along the path of movement of the carrier for inserting contacts one at a time in socket apertures, contact feed means to supply contacts in a pair of side by side rows with the contacts in each row being in like orientation and in an opposite orientation with respect to the other row, a pair of movable contact inserting members in the inserting means respectively associated with said rows of contacts and engageable with the end contact in each row to insert the same in a socket, means to operate the inserting members alternately and in timed relation to the advance of the carrier, contact seating means disposed along the path of movement of the carrier for seating contacts in a socket subsequent to inserting of the contacts by the inserting means, means for engaging the seating means once with each socket in timed relation to the advance of the carrier, means responsive to indexing of the carrier to remove sockets from the carrier subsequent to seating of the contacts, contact deforming means for deformed the outwardly extending portions of contacts seated in sockets to retain the contacts in the sockets, means to deliver the sockets from the socket removing means to the deforming means, and means to operate the deforming means in response to operation of the carrier indexing means.

3. In a machine for automatically assembling contacts in cast non-metallic sockets and the like, an indexable work carrier adapted to carry a plurality of sockets of the type each having a plurality of contact receivable apertures, means to index the carrier discretely in increments corresponding to the spacing of contact receivable apertures in a socket, flash breaking means disposed along the path of movement of the carrier mounted for engagement in all of the contact receivable apertures of a socket simultaneously, contact inserting means disposed along the path of movement of the carrier for inserting contacts one at a time in socket apertures, and subsequent to the operation of the flash breaking means on the socket, means to operate the inserting means in timed relation to the advance of the carrier, contact seating means disposed along the path of movement of the carrier for seating contacts in a socket subsequent to inserting of the contacts by the inserting means, means connecting the flash breaking and seating means for simultaneous operation, and means for engaging the seating means once with each socket in timed relation to the advance of the carrier.

4. In a machine for automatically assembling contacts having elongated tails in cast non-metallic sockets and the like with the tails extending outwardly of the sockets, an indexable work carrier adapted to carry a plurality of sockets of the type each having a plurality of contact receivable apertures with the tail-receiving slots of adjacent apertures disposed on opposite sides of the longitudinal line of the socket, drive means to index the carrier discretely in increments corresponding to the spacing of contact receivable apertures in a socket, flash breaking means disposed along the path of movement of the carrier mounted for engagement in all of the contact receivable apertures of a socket simultaneously, contact inserting means disposed along the path of movement of the carrier for inserting contacts one at a time in alternately reversed orientation in socket apertures subsequent to the operation of the flash breaking means on the socket, means to operate the inserting means in timed relation to the advance of the carrier, contact seating means disposed along the path of movement of the carrier for seating contacts in a socket subsequent to inserting of the contacts by the inserting means, means connecting the flash breaking and seating means for simultaneous operation, and means for engaging the seating means once with each socket in timed relation to the advance of the carrier, means for removing sockets in response to advance of the carrier and subsequent to seating of the contacts, deforming means to deform the contact tails to retain the contacts in the sockets, means to deliver sockets from the removing means to the deforming means, and means to operate the deforming means in response to actuation of said drive means.

5. In a machine for automatically assembling contacts of the type having elongated tails in sockets and the like with the contact tails extending outwardly of the sockets, an indexable work carrier adapted to carry a plurality of sockets of the type each having a plurality of contact receivable apertures, drive means to index the carrier discretely in increments corresponding to the spacing of contact receivable apertures in a socket, contact inserting means disposed along the path of movement of the carrier for inserting contacts one at a time in socket apertures, means to operate the inserting means in timed relation to the advance of the carrier, contact deforming means for deforming the tails of contacts received in a socket to retain the contacts in the socket, a ram mechanism for loading sockets into the deforming means, means to operate the deforming means and ram mechanism in response to operation of said drive means, and means to remove a socket from the carrier in response to advance thereof and subsequent to insertion of contacts in the socket including means to deliver the socket to the ram mechanism.

6. In a machine for automatically assembling contacts in apertures in sockets and the like each having a plurality of such apertures disposed in spaced relation, a movable work carrier, drive means to advance the work carrier discretely in increments corresponding to the spacing of contact receivable apertures in a socket, flash breaking means disposed along the path of movement of the work carrier and mounted for movement into all of the receivable apertures of a socket simultaneously and prior to the insertion of contacts therein, contact seating means disposed along the path of movement of the work carrier and mounted for movement into all of the contact receivable apertures of a socket simultaneously to engage and fully seat contacts previously inserted in the apertures, a driving connection between the flash breaking and seating means for simultaneous operation thereof, and cam control means connected to said drive means for operation of said control means in response to the operation of said drive means including a yieldable driving connection to one of said flash breaking and seating means.

7. In a machine for automatically assembling contacts each having a shoulder portion and an elongated tail portion at one side thereof in a socket having a plurality of contact-receiving apertures with the tail-receiving slots of adjacent apertures disposed on opposite sides of the longitudinal center line of the socket, the combination comprising a movable work carrier adapted to carry a plurality of sockets; means to advance the work carrier in discrete increments corresponding to the spacing of contact-receiving apertures in a socket; a contact feed device providing two parallel rows of contacts with the shoulders of each row disposed similarly and in a direction opposite to those of the other row; and a contact-inserting device disposed along the path of said work carrier and orientable with a socket carried therein, including means locating the apertures of a socket for receipt of a contact, and means for alternately selecting and inserting a contact from each of said rows to provide contacts in adjacent apertures with shoulders extending in opposite directions.

8. In a machine for automatically assembling contacts having a shoulder portion and an elongated tail portion at one side thereof in a socket having a plurality of contact-receiving apertures with the tail receiving slots of adjacent apertures disposed on opposite sides of the longitudinal center line of the socket, the combination comprising a movable work carrier adapted to carry a plurality of sockets; means to advance the work carrier in discrete increments corresponding to the spacing of contact-receiving apertures in a socket; a contact feed device providing two parallel rows of contacts with the shoulders of each row oriented similarly and in a direction opposite to that of the other row; and a contact-inserting device operatively associated with said carrier including a pair of contact-supporting means each adapted to receive the end contact from a row of said feed device and to maintain the contact supported in each with the shoulders oriented in opposite directions, a pair of contact-inserting blades each oscillatable through a contact-supporting means to engage a contact therein and to insert said contact in an aperture of a socket registering therewith, and means to oscillate said blades alternately in timed relation to the advance of said carrier.

9. In a machine for automatically assembling contacts having a shoulder portion and an elongated tail portion at one side thereof in a socket having a plurality of contact-receiving apertures with the tail-receiving slots of adjacent apertures disposed on opposite sides of the longitudinal center line of the socket, the combination comprising a movable work carrier adapted to carry a plurality of sockets; means to advance the work carrier in discrete increments corresponding to the spacing of contact-receiving apertures in a socket; a contact feed device providing two parallel rows of contacts with the shoulders of each row oriented similarly and in a direction opposite to that of the other row; and a contact-inserting mechanism including an inserter head having a pair of side-by-side recesses cooperating with said rows of the contact feed device and joined at one end to provide an exit throat of reduced cross section, each recess being adapted to receive the last contact from the associated row of said contact feed device, a flexible thin resilient guide member carried by the head and extending between said recesses and into said throat to guide contacts through said throat, a pair of spring-pressed members mounted on the head and extending into said recesses for yieldably supporting contacts received in said recesses with the shoulders oriented in opposite directions, a pair of contact-inserting members each oscillatable through one of said recesses for engagement with contact supported on a spring-pressed member to move said contact through said throat and into the aperture of an associated socket, and means to oscillate the inserting members alternately and in timed relation to the advance of the work carrier.

10. In a machine for automatically assembling contacts having a shoulder portion and an elongated tail portion at one side thereof in a socket having a plurality of contact-receiving apertures with the tail-receiving slots of adjacent apertures disposed on opposite sides of the longitudinal center line of the socket, the combination comprising a movable work carrier adapted to carry a plurality of sockets; means to advance the work carrier in discrete increments corresponding to the spacing of contact-receiving apertures in a socket; a contact feed device providing two parallel rows of contacts with the shoulders of each row oriented similarly and in a direction opposite to that of the other row; and a contact-inserting mechanism including an inserter head having a pair of side-by-side recesses cooperating with said rows of the contact feed device and joined at one end to provide an exit throat of reduced cross section, each recess being adapted to receive the last contact from the associated row of said contact feed device, a flexible thin resilient guide member carried by the head and extending between said recesses and into said throat to guide contacts through said throat, a pair of spring-pressed members mounted on the head and extending into said recesses for yieldably supporting contacts received in said recesses, a pair of reciprocatably mounted slides each engageable in a contact receiving aperture of a socket to locate another aperture for receipt of a contact, a pair of slide actuating means respectively associated with the slides, a pair of contact-inserting members each oscillatable through one of said recesses for engagement with a contact supported on a spring-pressed member to move said contact through said throat and into the aperture of an associatetd socket, means yieldably connecting each inserting member with said slide actuating means for movement together, means to prevent movement of a selected one of said slides, and means to oscillate the inserting members alternately and in timed relation to the advance of the work carrier.

11. In a machine for automatically assembling contacts in sockets having a plurality of contact-receiving apertures and including a movable work carrier adapted to carry a plurality of sockets and drive means to advance the work carrier in discrete increments, a mechanism for loading sockets having the contacts positioned in the contact-receiving apertures thereof into a contact-deforming mechanism including a reciprocating loading ram in operative alignment with said contact-deforming mechanism and having a plurality of fingers adapted to be engaged in a socket; a socket seat aligned with said ram and said contact-deforming mechanism, said seat having a yieldable wall facing said deforming mechanism; means for reciprocating said ram in timed relation to the operation of said work carrier to engage a socket in said seat and carry it into said contact-deforming mechanism; and means for delivering sockets to said seat in operative disposition for the deforming mechanism in timed relation to the operation of said ram.

12. In a machine for automatically assembling contacts in sockets having a plurality of contact-receiving apertures and including a movable work carrier adapted to carry a plurality of sockets and drive means to advance the work carrier in discrete increments, a mechanism for loading sockets having the contacts positioned in the contact-receiving apertures thereof into the socket-receiving means of a contact-deforming mechanism, including: a reciprocable ram in alignment with said socket-receiving means and having a plurality of fingers at its forward end adapted to be engaged in a socket; a socket seat aligned with said socket-receiving means and ram, and having a wall yieldable towards said deforming mechanism provided by a pair of pivoted stripper levers extending in opposite directions across the path of movement of said ram and spring means biasing the stripper levers towards said ram; and means for reciprocating said ram in timed relation to the operation of said carrier to engage a socket in said seat and carry it into the socket-receiving means of the deforming mechanism; means for removing a socket from said work carrier in response to operation thereof; a guide track cooperating with said removing means for delivery of a socket to said seat with the contact-receiving apertures thereof facing said ram; and an escapement in said track operating in response to socket-loading reciprocation of said ram.

13. In a machine for automatically assembling contacts having elongated tails in sockets having a plurality of socket-receiving apertures and in which the contact tails extend outwardly thereof, a contact-deforming mechanism including a seat adapted to receive the socket with the tails of the contacts extending rearwardly of the mechanism, a plurality of oscillatably mounted twister dies disposed rearwardly of said seat and each adapted to receive a contact tail during seating of a socket in the mechanism and to twist the received tail about its longitudinal axis in response to oscillatory movement of the die, contact back-up means mounted for lateral movement into and out of clamping engagement with the contact tails at a point between the twister dies and seat, and means to oscillate the twister dies about the longitudinal axes of the received tails and move the back-up means in timed relation to the operation of each other.

14. In a machine for automatically assembling contacts having elongated tails in sockets having a plurality of socket-receiving apertures in which the contact tails extend outwardly thereof, a contact-deforming mechanism including a seat adapted to receive a socket with the tails of the contact therein extending rearwardly of the seat; a base rearwardly of said seat; a plurality of twister dies oscillatably supported on said base rearwardly of said seat and each adapted to receive a contact tail during seating of a socket in the mechanism and to twist the received tail about its longitudinal axis in response to oscillatory movement of the die, said twister dies being angularly inclined laterally outwardly of the socket seat and the next adjacent dies being inclined in opposite directions; a pair of opposed slides each movable laterally inwardly of the mechanism perpendicular to the longitudinal plane of the tails; contact back-up plates mounted on said slides for movement into and out of clamping engagement with the contact tails at a point between the twister dies and the socket; and means to oscillate the twister dies and contact back-up plates in timed relation.

15. In a machine for automatically assembling contacts having elongated tails in sockets having a plurality of contact-receiving apertures and in which the contact tails extend outwardly thereof, a contact-deforming mechanism including a socket seat adapted to receive a socket with the tails of the contact therein extending rearwardly of the mechanism; a pair of opposed back-up dies mounted rearwardly of said seat for simultaneous movement laterally inwardly of the seat and perpendicular to the longitudinal plane of the tails; a pair of deforming dies mounted rearwardly of said back-up dies for movement parallel thereto, one of said pairs of dies being slidably carried by the other pair of dies, the cooperating opposed die surfaces of a back-up die and oppositely movable deforming die providing laterally offset cooperating surface for engaging a contact tail during operation of the mechanism and the cooperating die surfaces engaging adjacent tails being laterally offset in opposite directions to laterally offset the outer end portions of the tails relative to the portion disposed in the socket; and means to move the said back-up dies and deforming dies in timed relation.

16. In a machine for automatically assembling contacts having elongated tails in sockets having a plurality of contact-receiving apertures and in which the contact tails extend outwardly thereof, a contact tail deforming mechanism including a socket seat adapted to receive a socket with the tails of the contact therein extending rearwardly of the mechanism; a pair of opposed contact tail deforming dies mounted rearwardly of said seat for movement laterally inwardly thereof; a pair of opposed back-up dies mounted rearwardly of said seat for lateral movement towards and away from said seat, an opposed deforming die and back-up die being initially cooperatively engageable with the opposite sides of a contact tail to bend the outmost end portion thereof in the direction of movement of the engaging deforming die, the deforming die being subsequently engageable with the tail to bend the initially unbent portion of the same into the path of movement of the deforming die, and the opposed deforming die having a surface engageable with the initially bent over outer end of the tail subsequent to the bending of the tail into the path of movement of the first deforming die to further bend the initially unbent tail portion in the direction of the initially bent end of the tail; means for moving the deforming dies simultaneously; and means to move the back-up dies in timed relation to the operation of said deforming dies.

References Cited in the file of this patent

UNITED STATES PATENTS

| | | |
|---|---|---|
| 2,155,958 | Schmidt | Apr. 25, 1939 |
| 2,192,106 | Ross | Feb. 27, 1940 |
| 2,526,717 | Weisberg | Oct. 24, 1950 |
| 2,692,424 | Habel | Oct. 26, 1954 |
| 2,707,324 | Walther | May 3, 1955 |
| 2,775,283 | Greer | Dec. 25, 1956 |